(12) United States Patent
Bejar et al.

(10) Patent No.: US 6,526,258 B2
(45) Date of Patent: Feb. 25, 2003

(54) METHODS AND SYSTEMS FOR PRESENTATION AND EVALUATION OF CONSTRUCTED RESPONSES ASSESSED BY HUMAN EVALUATORS

(75) Inventors: Isaac I. Bejar, Hamilton, NJ (US); Sean J. Whalen, Ewing, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 09/916,810

(22) Filed: Jul. 27, 2001

(65) Prior Publication Data

US 2002/0001795 A1 Jan. 3, 2002

Related U.S. Application Data

(63) Continuation of application No. 09/381,545, filed as application No. PCT/US97/04607 on Mar. 21, 1997, now Pat. No. 6,295,439.

(51) Int. Cl.[7] .................................................. G09B 3/00
(52) U.S. Cl. ........................ 434/350; 434/118; 434/322; 434/362; 706/927
(58) Field of Search .............................. 434/118, 307 R, 434/308, 322, 323, 327, 347, 350, 362, 365; 273/429–432; 706/927; 707/500; 708/167

(56) References Cited

U.S. PATENT DOCUMENTS

| | | | |
|---|---|---|---|
| 4,978,305 A | 12/1990 | Kraft | |
| 5,204,813 A | 4/1993 | Samph et al. | |
| 5,306,154 A | 4/1994 | Ujita et al. | |
| 5,437,554 A | 8/1995 | Clark et al. | |
| 5,558,521 A | 9/1996 | Clark et al. | |
| 5,565,316 A | 10/1996 | Kershaw et al. | |
| 5,597,312 A | 1/1997 | Bloom et al. | |

Primary Examiner—Joe H. Cheng
(74) Attorney, Agent, or Firm—Woodcock Washburn LLP

(57) ABSTRACT

The present invention provides systems and methods for controlled presentation of constructed responses through a variety of computer applications to human evaluators for assessment. The systems and methods further provide for controlled presentation of the constructed responses to minimize the influences of psychometric factors on the accuracy of the human evaluators' assessments and to maximize the ability to efficiently generate data for use in analyzing the accuracy of the human evaluators' assessments and the difficulty of the constructed response categories or questions. The systems and methods of the present invention utilize a storage means which relationally stores data regarding the human evaluators, the constructed responses, the scores awarded and the computer applications to utilize. The systems also comprise assessment stations and processing means for selectively transmitting constructed responses to the assessment stations and receiving scores awarded by the human evaluators assigned to the assessment stations.

16 Claims, 15 Drawing Sheets

| booktxt | solname | scrptstr | app | scriptkey | comment |
|---|---|---|---|---|---|
| c1set | CHC108D | C108D | DELIVERY | 459 | |
| c1set | CHC1TUT | C1TUT | DELIVERY | 468 | |
| c8set | JFKC804D | C804D | DELIVERY | 390 | |
| c8set | JFKC805D | C805D | DELIVERY | 391 | |
| c8set | JFKC830D | C830D | DELIVERY | 392 | |

Figure 10

| Grader | Order | mask1 | mask2 |
|---|---|---|---|
| 153 | 1 | c607* | c806* |
| 153 | 2 | c608? | c805? |
| 153 | 3 | c609? | c804? |
| 154 | 1 | c609* | c804? |
| 154 | 2 | c608* | c805? |
| 154 | 3 | c607* | c806? |

Figure 9

METHODS AND SYSTEMS FOR PRESENTATION AND EVALUATION OF CONSTRUCTED RESPONSES ASSESSED BY HUMAN EVALUATORS

This application is a continuation of U.S. application Ser. No. 09/381,545, filed Feb. 4, 2000, now U.S. Pat. No. 6,295,439 B1, which is a continuation under 35 U.S.C. § 371 of International Application No. PCT/US97/04607, filed Mar. 21, 1997.

FIELD OF THE INVENTION

The present invention generally relates to systems and methods for assessment of constructed responses. More specifically, the invention relates to the presentation of constructed responses for human evaluation and the analysis of human evaluators' assessment.

BACKGROUND OF THE INVENTION

Many tests require examinees to provide answers, or constructed responses, that include written words and essays or figural responses which can be scanned in as images. Other tests may require that examinees enter their responses in electronic format, using a computer application directly, such as the Computer Based Testing System disclosed in U.S. Pat. No. 5,565,316, assigned to Educational Testing Service and incorporated herein by reference. Automated computer-based systems have been developed to permit human evaluation of textual or figural responses on-line. However, other tests require review of responses in other, more complicated forms. For example, a test question, or prompt, could require an examinee to provide an oral response (Test of Spoken English, foreign language examinations, etc.) or to videotape a performance. Other test questions may require that an examinee create a diagram or drawing which is too complex for scanning to provide an appropriate representation for evaluation. The National Council of Architectural Registration Board (NCARB) administers a licensing exams for architects in which an examinee's response is created through a specially designed computer application and may have multiple overlapping layers. The analysis of the responses to the NCARB exam requires human evaluators to precisely measure each line and angle to determine the appropriate score for the examinee. Therefore, a drawing application is a more appropriate environment for presentation of the constructed response to the human evaluator.

A separate dedicated computer-based assessment system is required to permit human evaluation of these various constructed response types on-line. Thus, there exists a need for one assessment system to dynamically determine which computer application will provide the optimum presentation capabilities for constructed responses in a variety of forms. It is further desired for a single assessment system to automatically initialize the chosen computer application and to present the constructed response to the human evaluators through the chosen computer application.

Furthermore, the need to monitor human evaluators to assure accuracy of assessment has been recognized. Presently, this has been accomplished only through presentation of monitoring papers, which have a predetermined score associated with them, or repeated presentation of the same constructed responses to ensure consistency. This is inefficient since it requires that the human evaluators take time to review and assess constructed responses which do not really require scores. Furthermore, repeated presentation of the same constructed responses is frustrating to the evaluators and does not provide for accurate assessment. Thus, there further exists a need for an assessment system capable of evaluating and monitoring the human evaluators to guarantee consistency and accuracy of grading without utilizing constructed responses which do not need assessment and, thus, wasting time and other resources.

Finally, the need to minimize the influence of extraneous factors on a human evaluator's assessment has been well documented. For example, the time of day that a constructed response is presented to a human evaluator may influence the score awarded. Thus, safeguards are required to insure consistency and fairness when human evaluators are assessing constructed responses.

Test developers are also concerned with assessing the difficulty of test questions. To promote fairness, test questions presented to different examinees that are intended to be of the same difficulty should have highly consistent difficulty levels to prevent variations in difficulty of the test questions from affecting scores of the examinees.

Complex manual grading designs and methods have been used in the past to investigate the difficulty of test questions and the effect of outside influences on human evaluators. However, there exists a need for a computer-based assessment system which can be used as a tool in test and scoring development. There further exists a need for methods of presenting constructed responses to various human evaluators in a controlled manner so that the extraneous factors may be minimized. Finally, there exists a need for presenting constructed responses to human evaluators so that test question difficulty and human evaluator scoring may be assessed without the need for excessive repetition.

SUMMARY OF THE INVENTION

The present invention provides systems and methods for use in presenting constructed responses through various computer applications to human evaluators in a controlled manner to allow for monitoring and evaluation of both the human evaluators and the test questions. The systems and methods overcome the problems of the prior art systems described above and provide a more efficient and controllable monitoring and test development tool.

The systems of the present invention utilize a relational database for storing data related to the constructed responses, the human evaluators and the computer applications. The constructed responses can be categorized based on many things, including descriptive characteristics of the constructed response that are of interest to a particular research scientist; most frequently, they are categorized based on the prompt which elicited the response. Groups of related prompts, or the individual prompts, by which the constructed responses are categorized are referred to herein as constructed response categories. The database, or memory, generally holds the data so that each human evaluator is assigned to a plurality of constructed responses (via assignments to constructed response categories) which he will assess. Furthermore, in the database, each constructed response is stored in relation to at least one computer application which is capable of presenting the constructed response to the human evaluator so that a meaningful assessment may be made.

The systems for presenting the constructed responses to human evaluators utilizing a related computer application further comprise at least one assessment station for the human evaluator to review the constructed responses and award a score. Furthermore, the systems utilize a processor for accessing the data in the database, for enabling an applicable computer application for use with the constructed response to be presented to the human evaluator and for presenting the constructed responses to the human evaluator. The system may further comprise a database, which could be the same relational database described above, for storing the scores awarded by the human evaluators to the constructed responses such that the score is stored in relation to both the constructed response and the human evaluator. In addition, the system of the present invention can utilize a plurality of assessment stations, wherein a human evaluator is assigned to each assessment station. In that case, a communication link between the processing means and the assessment stations may be used for transmitting the constructed responses from the database to the assessment stations and for transmitting scores from the assessment stations to the database.

The methods of the present invention of analyzing human evaluator assessments and difficulty of constructed response categories or individual test items also utilize a database as described above. The methods further comprise the steps of electronically transmitting a plurality of constructed responses assigned to two or more constructed response categories to a first human evaluator and a plurality of constructed responses assigned to two or more constructed responses categories to a second human evaluator, wherein at least one of the constructed response categories is the same for the first and second human evaluator. The methods further provide for electronically receiving scores awarded by the first and second human evaluator for each of the constructed responses and storing the scores in a database. Based on the information to be obtained, the methods provide for comparing the scores awarded by the first and second human evaluators and the scores awarded to the constructed responses whose constructed response category was the same for both human evaluators to analyze the human evaluators' assessments and the difficulty of the question types. Preferably, a statistical computer application such as SAS or SPSS uses the data collected during the method described above to perform more complex analysis.

The methods of the present invention of controlling the presentation of the constructed responses to the human evaluators during an assessment session to control psychometric effects in the scoring process also utilize a database as described above. The methods further comprise the steps of assigning each constructed response to be assessed by at least two human evaluators, assigning each human evaluator to at least two constructed response categories and ordering the constructed responses to be presented to the human evaluators such that the human evaluators receive the constructed responses in a different order during the assessment session. This method may further comprise the steps of time shifting the constructed response categories to be assessed by each human evaluator during an assessment session. Furthermore, the constructed responses assigned to a particular human evaluator within a constructed response category may be selectively ordered.

BRIEF DESCRIPTION OF THE DRAWINGS

A full understanding of the invention can be gained from the following description of preferred embodiments when read in conjunction with the accompanying drawings in which:

FIG. 9 shows a preferred database for use in controlling the order of distribution of constructed responses to human evaluators;

FIG. 10 shows a data table used in presenting the constructed response to the human evaluators in accordance with a preferred embodiment of the invention;

DETAILED DESCRIPTION OF PREFERRED EMBODIMENTS

Systems and methods which fulfill the above-mentioned needs and provide other beneficial features in accordance with the present invention are described below with reference to the figures. Those skilled in the art will readily appreciate that the description given herein with respect to the figures is for explanatory purposes only and is not intended in any way to limit the scope of the invention thereto. Also, common reference numbers are used throughout the figures to represent common elements.

Figure 1:
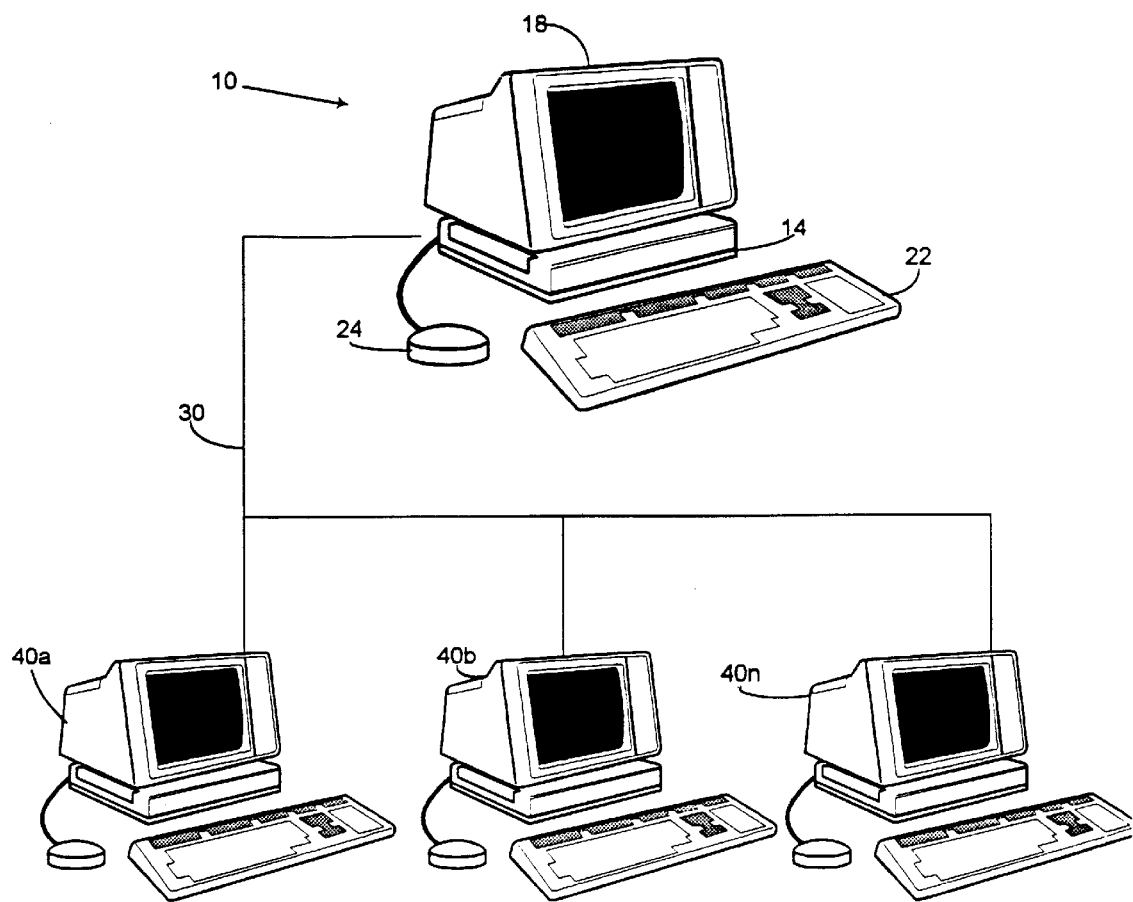
FIG. 1 shows a block diagram of a preferred embodiment of the system of the present invention.

Referring now to the figures, FIG. 1 shows a block diagram of one system for use in the preferred embodiments of the present invention. Generally, the systems and methods of the present invention all entail the use of computer-based assessment systems wherein constructed responses are presented to human evaluators for assessment. A computer-based assessment system 10 includes a memory for storing constructed responses and the scores awarded by the human evaluators. The scoring system also includes a processor 14 which can access the memory. The processor preferably implements an operating system, which is capable of running computer applications needed for the presentation of the constructed responses to the human evaluators.

In addition, the assessment systems include a presentation means, or a way of providing the constructed responses to the human evaluators in a meaningful way for them to review. Thus, the presentation means could be a monitor 18, an audio means, such as a speaker or via telephonic communication, or a videotape or audio tape player (not shown), or a fully digitized video system (not shown)

displayed on the computer monitor 18. As shown in FIG. 1, the assessment systems can be implemented as stand-alone systems with one computer. However, in some embodiments, a number of assessment stations are utilized. In that case, the presentation capability is available at each assessment station as shown in assessment station 40a. The system also has some input means allowing a human evaluator to enter the score to be awarded to the constructed response presented. Input could be in the form of a paper score sheet on which the evaluator indicates the constructed response and the score awarded. Another method for allowing the human evaluators to enter their scores is by wanding in scores from a barcode as disclosed in U.S. Pat. No. 4,978,305, assigned to Educational Testing Service, incorporated herein by reference. However, in preferred embodiments, the input means will allow direct entry into the assessment system, such as through use of a keyboard 22 or a mouse 24 located at the assessment station where it is easily accessible by the human evaluators. Through these electronic input means, the scores are entered and stored in the memory in relation to the constructed responses to which they were awarded without the need for additional paper and while reducing the possibility of human error corrupting the score assignment.

As discussed above, the scoring system can be a stand-alone system located completely on one computer (shown above the dashed line in FIG. 1). However, other preferred embodiments may include a plurality of assessment stations 40a, 40b, 40c, . . . , 40n-1 from which individual human evaluators could work simultaneously reviewing constructed responses. In these preferred embodiments, a communication means 30, such as a data bus, local area network, wide area network, or the Internet and the WORLD WIDE WEB may be used to transmit information from a central server to the assessment stations. At each assessment station, there is preferably a presentation means, as discussed above, such that the human evaluator may view or listen to the response of the examinee. The assessment station may be merely a "dumb terminal" or network computer in which the bulk of the computing power is on the server side of the network and the network computer is unable to operate independent of the network connection and the centralized processing power. In another embodiment, each assessment station would also include a processor means and an operating system. Thus, the server may transmit the computer application to the assessment station and instructions to the operating system to enable and initiate the computer application. In yet another embodiment, the assessment stations may also have a memory and the computer applications used in presenting the constructed responses may be stored locally at the assessment stations. This would minimize the amount of data transmitted from the server to the assessment station, reduce the time necessary to commence scoring and reduce traffic on the communication network. Thus, in a preferred embodiment, each assessment station contains a PC with at least a suitable processor such as an INTEL 386 and a hard drive suitable for storing the constructed responses, and other information described below in more detail. Laptop and hand-held computers could also be utilized as assessment stations.

Human evaluators are assigned to each or some of the assessment stations and to the server (or stand-alone station). Each human evaluator may then review the constructed responses presented at their assigned workstation and award a score to each. Again, the scores may be input through a variety of means.

Figure 2A:
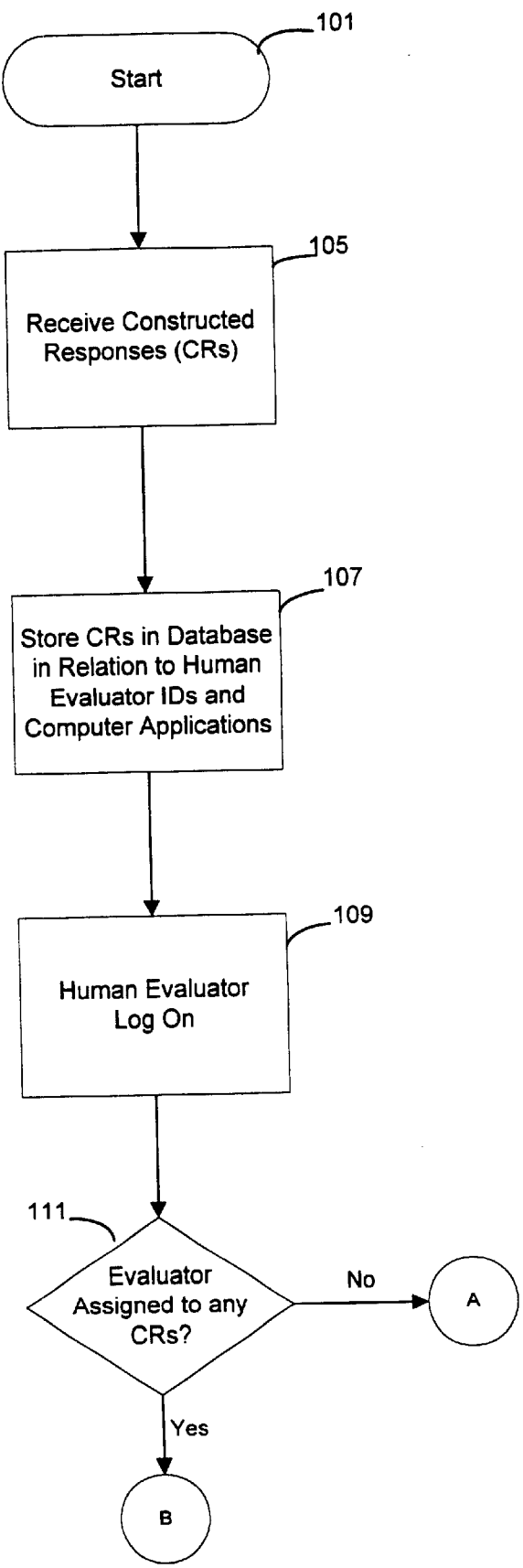
FIGS. 2A–2C show a high-level flowchart showing the steps required for the method of selecting an appropriate computer application and presenting the constructed responses to the human evaluator through that computer application.
Figure 2B:
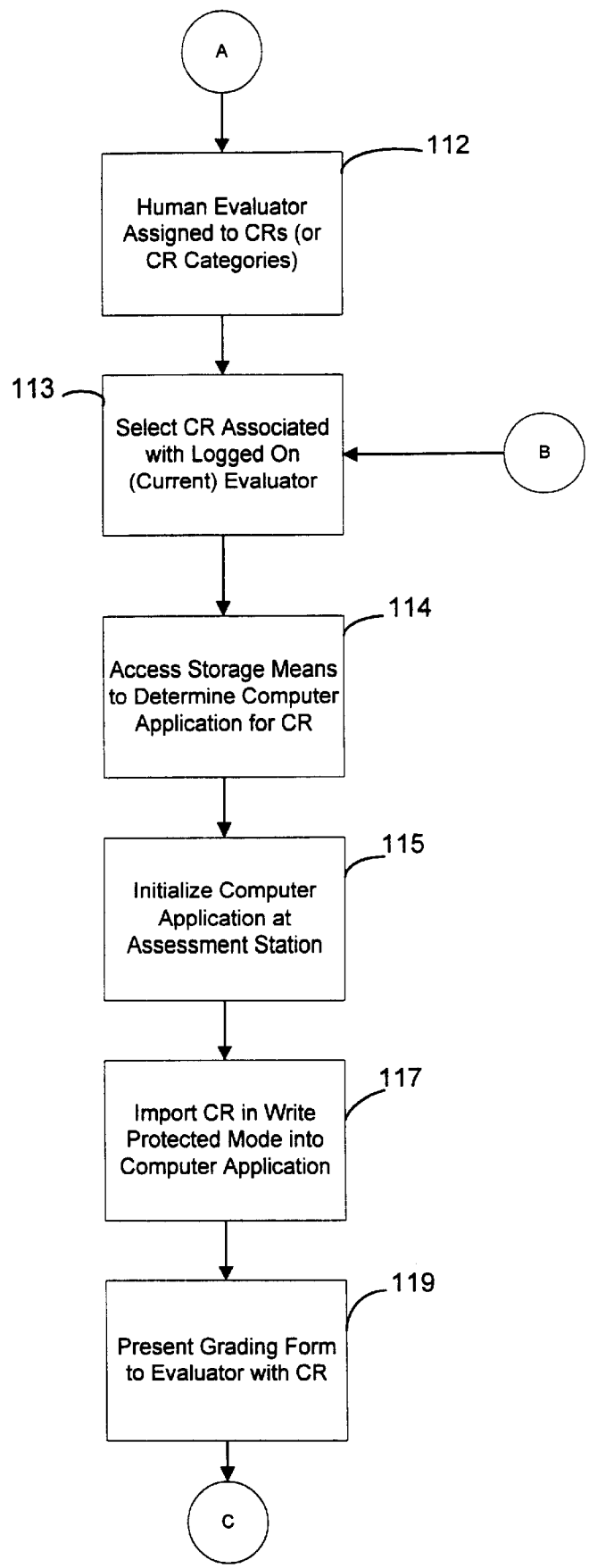
Figure 2C:
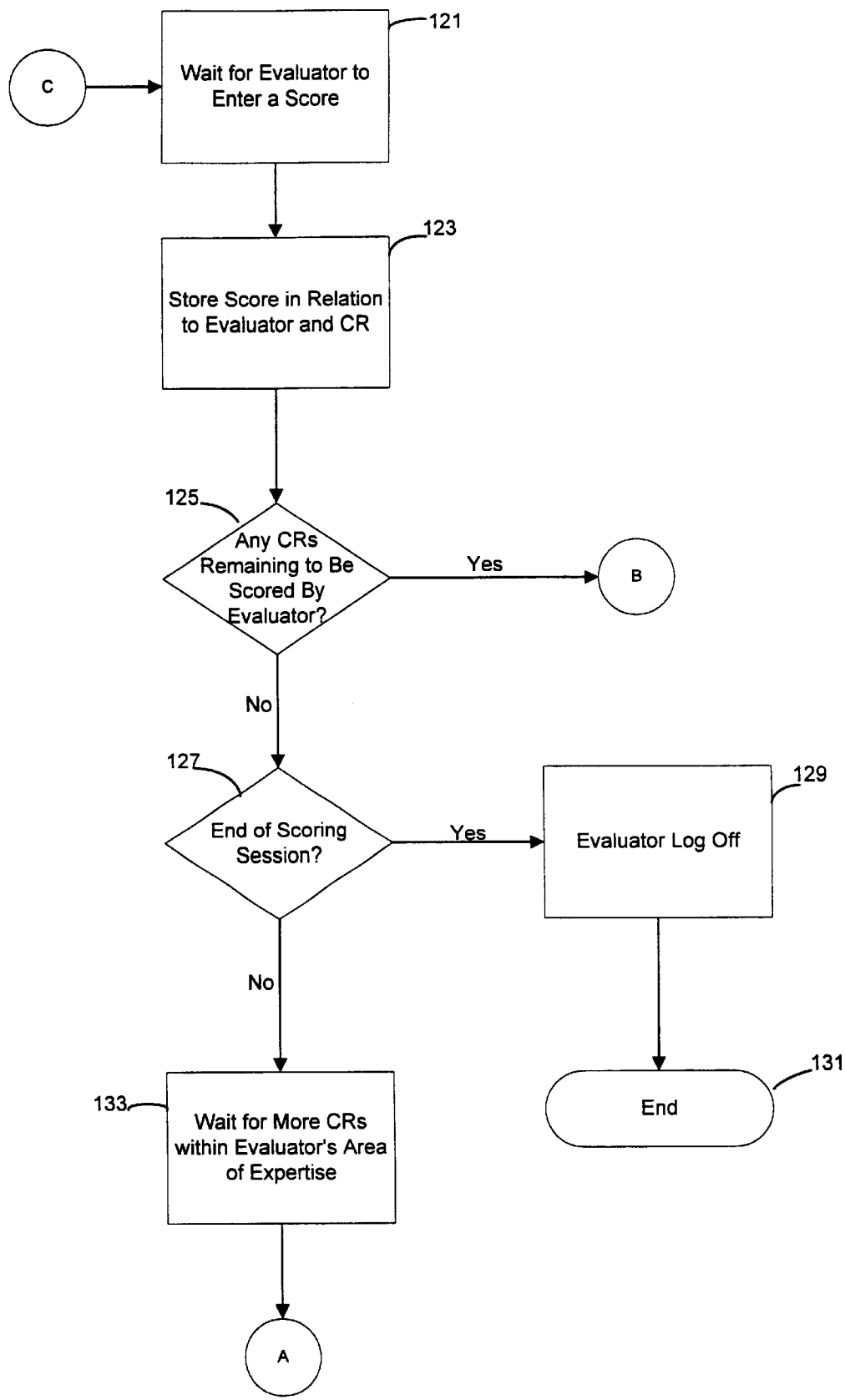

It should be understood from the foregoing that the computer applications are preferably installed on the server or at the assessment stations. Referring now to FIGS. 2A–2C, FIG. 2A shows that the constructed responses 32 are received at step 105 from the examinees or the individual test programs. In preferred embodiments, the constructed responses are transmitted to a separate ETS system, the Network Data Distribution System (NDDS), which is described in U.S. Pat. No. 5,565,316, assigned to Educational Testing Service, incorporated herein by reference. The NDDS program creates an individual file for each constructed response created by examinees and requiring evaluation. The NDDS program deposits the file in an accessible BANYAN network directory. The files are preferably stored in a compressed binary format, which includes information regarding the constructed response. The processor 14 of the present invention then initiates a batch file to extract the information from the files. Other means for generating the file information may also be implemented in connection with the present invention. For example, manual processes may be implemented to operate in conjunction with the scanning process when constructed responses are scanned to create the electronic file. In such applications, operators responsible for scanning constructed responses may also input information related to the intended file name and file extension, the computer application(s) which should be used to present the constructed response, the constructed response category, the prompt question which elicited the constructed response, etc. Other automated and manual methods including such file formatting information in the constructed response files are also contemplated as within the scope of the present invention.

Once a constructed response file which incorporates the formatting information has been created by any of the above-described means, a batch file preferably establishes a loop which continuously calls another program. The second program, called the WORKER program, extracts from the constructed response files their internally stored filename, the test question name, the constructed response categories, the amount of time the examinee took to complete the constructed response and whether the solution is in metric or imperial units (for NCARB solutions), among other information. This information is then utilized to relationally store the information related to the constructed response in the database as described more fully below. In general, the identity of the constructed response is keyed to the name of the computer application for use in presenting the constructed response. In addition, the identity of the constructed response is keyed to the corresponding constructed response category. An example of the code used in one preferred embodiment to extract and store the information appropriately in the database is given below:

| | |
|---|---|
| Script | @echo off<br>if exist %2 goto loop<br>echo from getinfo >> %2<br>:loop<br>for %%f in (%1) DO worker.bat %%f %2<br>-----------<br>worker.bat<br>@echo off<br>echo %1 >> %2<br>gzip -davc -S .* %1 \| Findstr /R "[^a-z]Name Elapsed UnitString" >> %2 |

Again, the identity, or filename, of the constructed responses are then stored in memory in a relational database relating the human evaluators, the constructed responses and the corresponding computer applications which are capable of presenting the responses to the human evaluators. The computer applications stored in the database should be ones which are capable of running with the operating system already installed on the server or assessment station. Thus, in one preferred embodiment, a WINDOWS type operating system is used. Therefore, the computer applications which may be used to present the constructed responses include WORD PERFECT for WINDOWS, WORD, the NCARB DELIVERY APPLICATION described in detail in the co-pending patent application Ser. No. 08/811,890, now U.S. Pat. No. 6,056,556, filed on Mar. 5, 1997, MICROSOFT SOUND PLAYER/RECORDER for audio files, MEDIA PLAYER for digital video, APPLE QUICK-TIME for digital video, NETSCAPE for HTML files and JAVA applications, MICROSOFT PAINTBRUSH for bit-map style graphic images, etc. If, on the other hand, the operating system is a DOS type operating system, the computer applications may include WORD PERFECT for DOS, etc.

To store the constructed responses in relationship to the corresponding computer applications, each constructed response should be analyzed to determine which computer application(s) stored in memory and capable of being executed by the operating system are compatible with the form of the constructed response (step 107). In one preferred embodiment, each constructed response is stored in a single file. The file extension indicates the type of computer application that can most effectively present the constructed response to the human evaluator for assessment. For example, the file extension can indicate that a word processing application would be appropriate with a ".WP", that a drawing application is preferred with a ".DRW", an audio application with ".AUD", etc. The file extension may, alternatively, indicate the exact computer application to use to present the response. For example, if WORD PERFECT FOR WINDOWS is the preferred computer application, the file extension might be ".WWP", whereas if a DOS WORD PERFECT application is preferred, the file extension might be ".DWP". As discussed above, the NDDS program is preferably used to transmit constructed responses between the testing programs and the scoring program of the present invention. If the testing program provides for electronic creation of the constructed responses, the appropriate file name, indicating the computer application to use in presenting the constructed responses to human evaluators may be created automatically by the testing program based solely on the question, or prompt, to which the examinee is responding. Such is the case with the Computer Based Testing program discussed above.

In other cases a separate manual or automated procedure may need to be implemented to create the correct file name extension for use in the present invention. In some cases, as described above, the file name extension alone will not provide all the information required to initialize and execute the appropriate computer application. In those cases, a separate program may be implemented to analyze the file name extension along with other formatting information included in the constructed response file (as well as information relating to the operating system in place at the server or the individual assessment stations) to determine the appropriate computer application to key to the constructed response file name.

Figure 3:
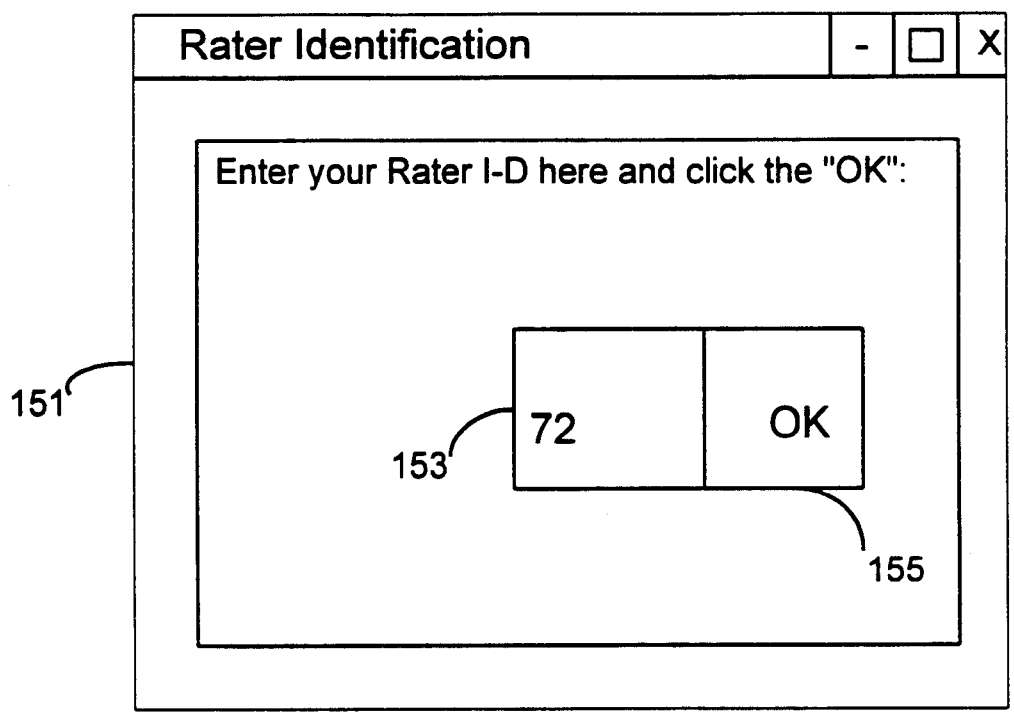
FIG. 3 shows a preferred human evaluator log-on/log-off window for use in the present invention.

Regardless of the method used for determining the computer application to use, at step 107, the identity of the chosen computer application is keyed to the corresponding constructed response in memory (see the APP field 231 in the database of FIG. 10). Next, at step 109, an evaluator logs on to the computer-based scoring system 10, preferably using a "Rater Identification" window, as shown in FIG. 3. Again, if the system is designed as a stand-alone system, the human evaluator will log on to the only computer. Alternatively, if the system is networked, the human evaluator can log on to an individual assessment station 40a–40n.

Then, at step 111, the system determines if the human evaluator who has just logged on is assigned to assess any constructed responses. If he is not, at step 112 (FIG. 2B), the system assigns the human evaluator to a number of constructed responses, preferably based on the evaluator's areas of expertise in assessing constructed responses. The assignment of human evaluators to constructed responses, in practice, preferably occurs before the evaluator logs on to the system. Generally, the human evaluators will be known before logging on to the system and will be assigned an evaluator identification code in advance. The human evaluators are preferably assigned to score certain categories of constructed responses based on their areas of expertise. For example, if a constructed response involves a science question prompt, a person skilled in assessing science answers is assigned to that constructed response. Similarly, human evaluators are assigned to constructed responses on architectural designs based on their skill and knowledge of scoring architecture solutions. Thus, in one preferred embodiment, each constructed response is categorized based on the question type to which the examinee was responding when creating the constructed response. For example, one constructed response may fall in the English literature essay category, whereas another may fall in the architectural floorplan category. Then, the human evaluators, based on their expertise, are assigned to categories of constructed responses.

However, this categorization is not necessary for the performance of the systems and methods of the present invention. Therefore, after a human evaluator logs on to the system, the evaluator may be assigned to assess, or score, any or all of the constructed responses currently stored in memory. For example, if the present invention is implemented as a stand-alone system, and the human evaluator is an individual teacher, the constructed responses are typically test or homework answers submitted by the teacher's students. Thus, the teacher would be required to assess all of the constructed responses stored in memory and the categorization of constructed responses and assignment of constructed responses to human evaluators would be unnecessary.

In either case, once the human evaluator has been assigned to a number of constructed responses, at step 113, the system selects a particular constructed response associated with the logged on human evaluator, defined as the current human evaluator, to present to the evaluator for assessment. The processor next, at step 114, accesses the memory to determine the computer application assigned to the constructed response (APP field 231 in FIG. 10). The processor then initializes the computer application, at step 115. The processor may need to determine the exact computer application to execute based on the file extension application type and the operating system.

For example, if the file extension merely indicates that a word processing application should be used, the processor may need to be programmed to utilize information about the operating system and the available computer applications to determine which application to execute. Thus, if the file extension indicates a word processing application, and the operating system is WINDOWS, the processing means may be programmed to execute WORD for WINDOWS. Any commands necessary to initialize the computer application for the operating system environment may also need to be executed upon initiation of the computer application. The systems and methods of the present invention preferably initialize and execute the appropriate computer application by building a string of text that is a command line to run the appropriate presentation computer application. The command is sent to the operating system program's execution function. An example of the command line generated to execute the appropriate computer application follows:

```
CRname$ = "LauraEssay.DOC"
Application$ = "Word.exe"
ReturnCode = WinExec(Application$ & CRname$)
if ReturnCode <> ErrorCode then continue with
    Program
```

The WinExec function is a standard WINDOWS function available through most WINDOWS applications, such as VISUAL BASIC, WORD, EXCEL, ACCESS, etc. Some applications, furthermore, require that options be included in the WinExec command line and the command line created by the present invention may be modified according to the demands of the specified computer application. The command line generated may also be more generic and provide for execution of computer applications in different operating system environments. An example of code used which can initialize and execute other computer applications is given in appendix A.

Once the computer application has been executed, the constructed response is preferably imported to the computer application at step 117. Preferably, the constructed response is imported in a write protected mode so that the response is not corrupted by the human evaluator. This ensures that the constructed response remains intact, without revisions and is, thus, available for future-use, review and possibly assessment by other human evaluators.

In one preferred embodiment, the computer application may also be initialized and executed in a "view only" mode as a second means of protecting the constructed responses and preventing them from being altered by the human evaluators. The computer application is preferably accessible by the human evaluator so that s/he can utilize the tools provided by the computer application (such as zoom, scroll, page up or down, volume adjustment, review/replay audio response, search for key words, measure line segments or angles, word count, identify elements in a drawing application, etc.). This will allow the human evaluator to more thoroughly evaluate the constructed responses by eliminating a layer of an architectural drawing, for example, or zooming in on an area of a diagram or drawing.

Figure 4:
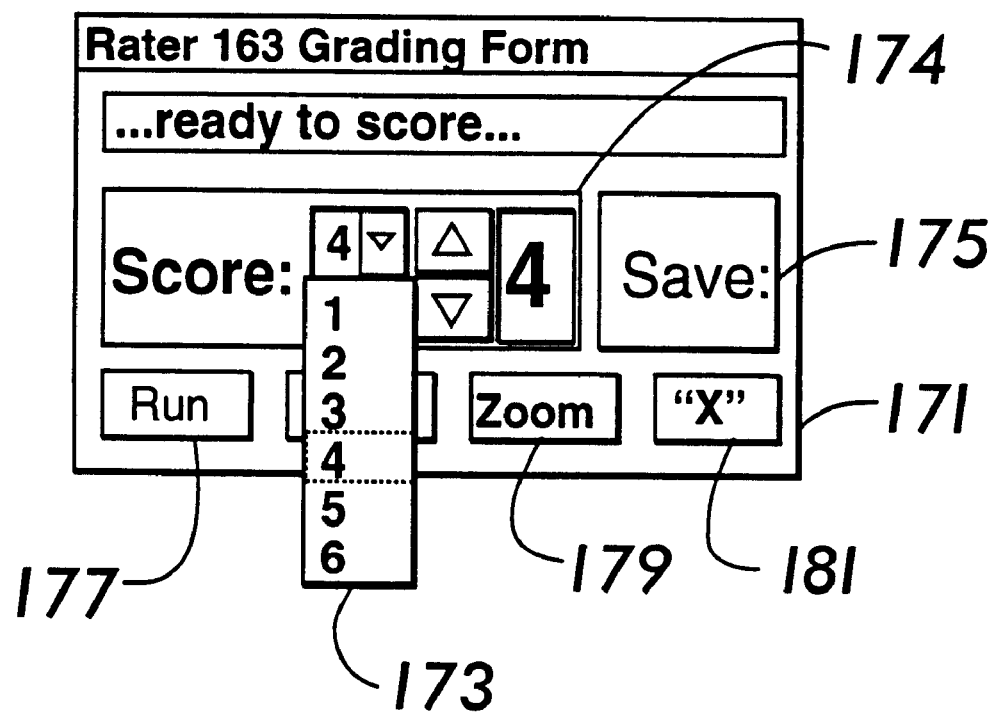
FIG. 4 shows a preferred grading form window for use in the present invention.

With the computer application running and the constructed response available, a grading form is presented to the human evaluator, at step 119. An example of a grading form for use in the present invention is shown in FIG. 4, and will be discussed more fully below in connection with that figure. However, in general, the grading form is preferably presented to the human evaluator on the screen so that the score awarded by the human evaluator may be automatically, electronically transmitted to memory, where it will be available for further analysis. The grading form permits the human evaluator to award a score to the constructed response currently presented, among other actions.

While the human evaluator is manipulating the constructed response through the computer application in order to fully assess the response, the processor waits, at step 121 (FIG. 2C), for the evaluator to enter a score through the grading form. Once the score has been entered by the human evaluator, the processor stores the score in memory in relation to both the human evaluator and the constructed response for which the score was awarded. Other information may also be stored in relationship to the constructed response at this time, such as the date and time that the score was awarded, the elapsed time the human evaluator took to analyze and award a score, etc. This allows for further analysis of the difficulty of the constructed response category and the monitoring of evaluator assessment, as will be described more fully below. Finally, at step 125, the processor accesses memory to determine if there remain any constructed responses for the particular human evaluator to score.

If there remain constructed responses for the human evaluator to assess, the system returns to step 113 where the next constructed response is accessed from memory and presented to the human evaluator for assessment. If no other constructed responses remain that have been assigned to the particular human evaluator, at step 127, the system next determines whether the human evaluator should end the scoring session. If the scoring session should end, the human evaluator is sent the log off message at step 129, informing him that he is finished assessing constructed responses. The log off window is preferably the same as the log on window shown in FIG. 3. If the scoring session is not over, the system awaits additional constructed responses within the evaluator's area of expertise at step 133 so that they may then be presented to the human evaluator. After additional constructed responses become available for assessment, the method returns to step 112 (FIG. 2A) in which the constructed responses are assigned to the human evaluator. The method then continues with the constructed responses being presented to the evaluator for assessment.

Referring now to FIG. 3, as discussed above, before a human evaluator may begin scoring constructed responses, in some preferred embodiments, the human evaluator preferably logs on to the system and is assigned various constructed responses. FIG. 3 depicts a typical log on window 151. The window prompts the human evaluator to enter a "Rater-ID". The human evaluator, as discussed above, may be assigned a particular identification code. This identification code is preferably predetermined and the human evaluator is informed what his or her "Rater-ID" or identification code is in advance. Thus, when beginning any scoring session, the human evaluator is asked to input this identification code in block 153 of the log on window 151. Each human evaluator's identification code 38 is stored in memory in relation to the categories of constructed responses that evaluator is eligible to assess, usually based on the evaluator's areas of expertise. Thus, after the evaluator logs on to the system using the predetermined identification code, the processor is able to access the memory to determine which constructed responses should be presented at the assessment station at which the evaluator logged on, defined herein as an active assessment station. Again, some input means is needed to allow the evaluator to enter his identification code. As discussed above, this is preferably through a keyboard or a mouse. In addition, the evaluators may be assigned to certain assessment stations. In that case, the identification code for the human evaluator assigned to the station can be inserted automatically by the system. However, the evaluator will still be expected to verify the identification code and click on the "OK" window 155 or hit enter on the keyboard when he arrives at his assigned assessment station.

Referring now to FIG. 4, a typical grading form window 171 is shown. The grading form window 171, as discussed briefly above, is present on the screen when the human evaluator is presented with the constructed responses to assess. Regardless of the form of the constructed response, whether textual, drawing, video or audio, the grading form window 171 will also be presented. Typically, the grading form window need only allow the human evaluator to enter a score, whether numeric or alphabetic. Upon receiving any input from the evaluator through the grading form window 171, the score awarded can be stored automatically in memory in relationship with the human evaluator and the constructed response presented. However, in preferred embodiments of the present invention, the grading form window is slightly more complex. For example, in one preferred embodiment, the grading form window 171 contains a pull-down option 173 which presents to the human evaluator score choices within a predetermined range of scores. In FIG. 4, the score choices range from 1 to 6, as an example. However, any range could be presented with the pull-down window, and the scoring range may be modified based on the type of constructed response being assessed. For example, AP exams generally have a scoring range between 1 and 5, whereas NCARB scores should fall between 1 and 4. Those skilled in the art of programming in WINDOWS environments will readily know how to create windows, dialog boxes or pop-up boxes on the screen, as well as providing pull-down options. The scoring range may be stored in relationship to the constructed response or constructed response category in memory as will be discussed more fully below. Generally, the range may be accessed by the processor and used in determining the scores to present through the pull down option 173.

Thus, in FIG. 4, the scoring range is presented with the pull-down window 173. The human evaluator may then select the score he wishes to award to the constructed response by using a mouse to click on the score. For example, in FIG. 4, the evaluator has selected a score of "4". Other methods could be used by the human evaluator to select a score from the pull-down window. For example, the evaluator could manipulate the score being highlighted through use of the arrow keys on a keyboard and hit enter when the chosen score is highlighted. Otherwise, the evaluator could bypass the pull-down window altogether and merely enter a score through the keyboard.

After a score has been selected and is shown in the score box 174, in preferred embodiments, the human evaluator preferably selects the "Save" button 175 before the score is stored in memory. This provides the evaluator with a second chance to review the constructed response and assess his score. It also reduces the possibility of a score being awarded inadvertently by the evaluator selecting the wrong score from the pull-down window or accidentally depressing a number on the keyboard. The second step of hitting the "Save" button gives the evaluator a chance to rectify mistakes or errors in score entry before the score is submitted to the processor and stored in memory in relation to the constructed response.

Other options are available to the human evaluator through the grading form in preferred embodiments of the present invention. As shown in FIG. 4, the grading form window 171 may also contain a "Run" button 177. This provides the human evaluator with some control over the presentation of constructed responses. Instead of the system automatically presenting the next constructed response to the evaluator as soon as a score is awarded to the prior constructed response, the "Run" button 177 gives the human evaluator the ability to request the next constructed response only when he is ready. Thus, if the human evaluator wishes to take a break from scoring, he has that option.

Other options available to the human evaluators through the grading form window 171 include the use of the "Zoom" button 179 and the "X" button 181. As discussed above, the human evaluator should be able to manipulate the presentation of the constructed response to facilitate the assessment process. For example, if the constructed response is an oral message, the evaluator should have the ability to rewind the message, replay it, stop the playback, etc. With a textual response, for example an essay, the evaluator should be able to scroll or page up and down the screen to view the entire response.

It may also be desirable to allow the evaluator to run certain other tools available through the computer application being used to present the constructed response. For example, the evaluator could run the "Spell Check" or "GRAMMATIK" tools available in WORD PERFECT to aid in the assessment of the writing style constructed responses. Likewise, with drawing responses which are typically used in the architectural exam, it may benefit the evaluator to zoom in on particular areas of the drawing. While the evaluator will preferably have direct access to all the tools available through the computer applications, the "Zoom" button 179 on the grading form is yet another way for the evaluator to manipulate the constructed response during his assessment. The "Zoom" button 179 causes the scoring system to transmit commands to the computer application to assist the evaluator and prevent unnecessary training on the individual computer applications. Likewise, with essay constructed responses, the grading form could present buttons indicating "Scroll Down" or "Scroll Up" for the evaluators' convenience.

Finally, the "X" button 181 shown in the grading form window 171 of FIG. 4 may be utilized to allow the human evaluators to enter diagnostic remarks or general comments relating to the particular constructed response. These comments may be transmitted to the examinee who created the constructed response, or may be useful in determining the rationale behind the score awarded if a disparity in scores is later ascertained. Of course, other options could be made available to the human evaluators through the grading form window and the software code required to incorporate other options is within the ambit of those skilled in the art.

Figure 5:
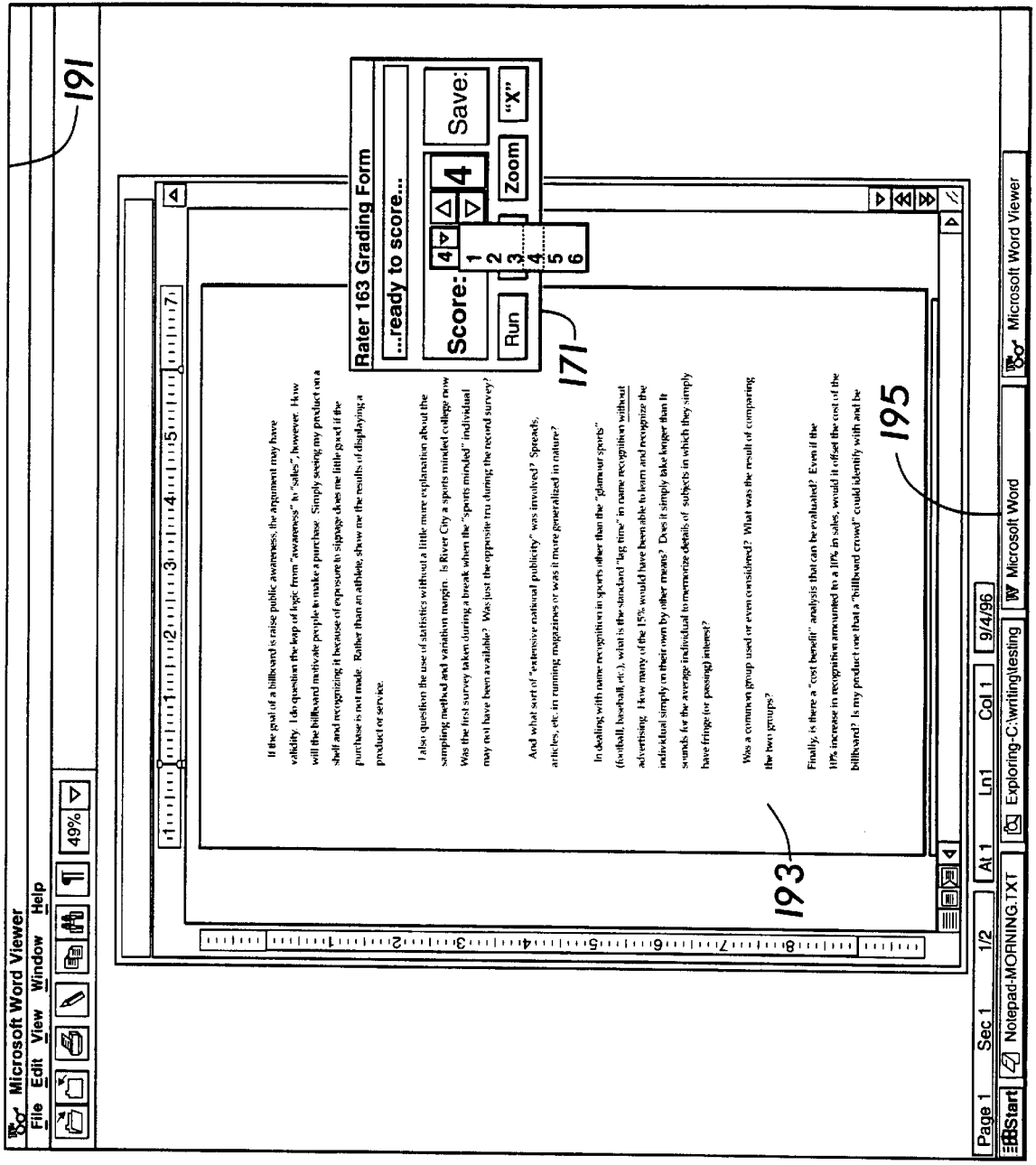
FIG. 5 shows a preferred embodiment of a human evaluator scoring screen with a word processing application and a textural constructed response.
Figure 6:
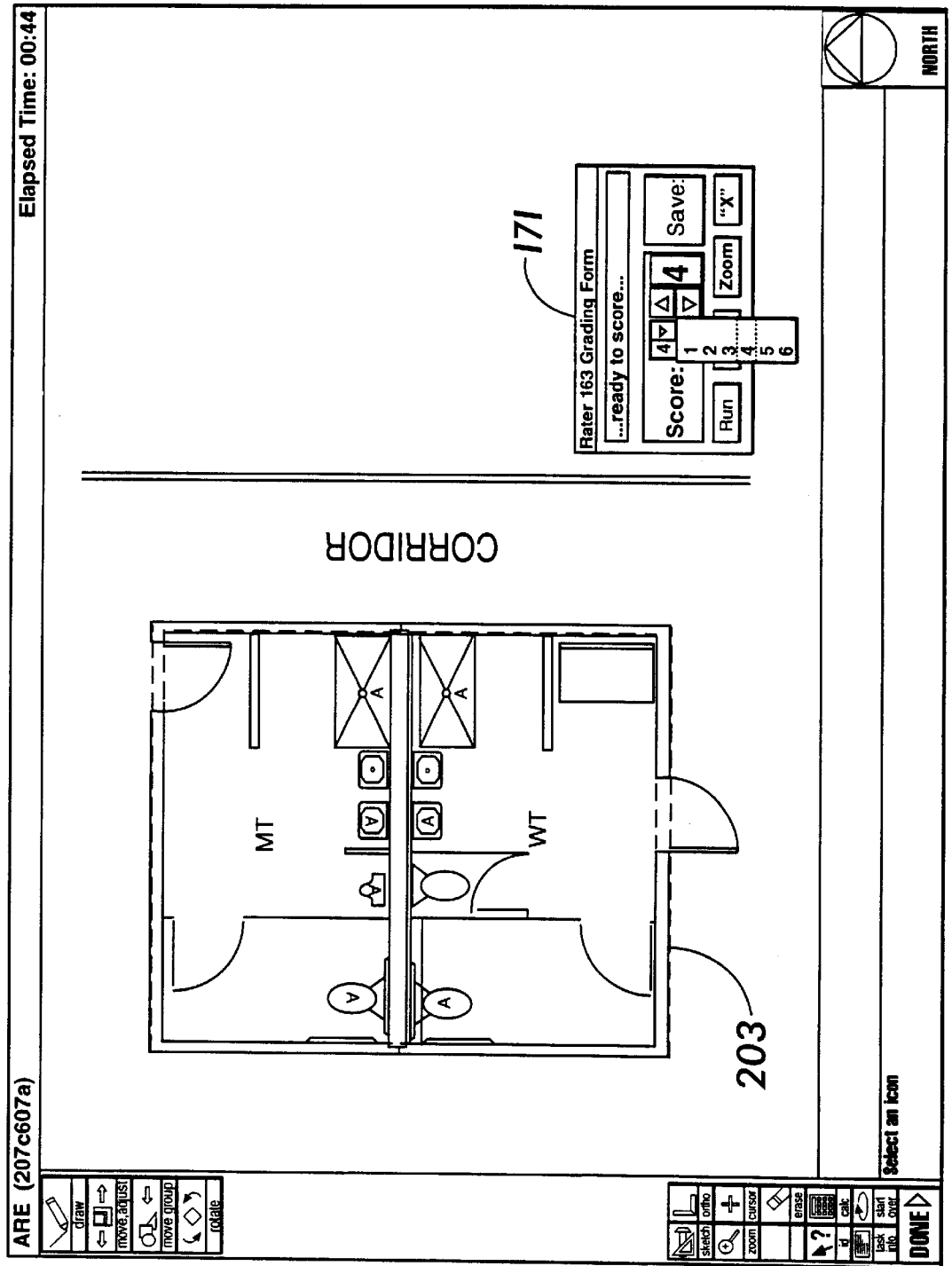
FIG. 6 shows a preferred embodiment of a human evaluator scoring screen with an architectural computer application and constructed response.

FIGS. 5 and 6 show typical presentation to human evaluators of constructed responses using different computer applications, based on the requirements of the constructed responses. FIG. 5 shows a monitor 191 at an assessment station wherein an essay constructed response 193 is presented through the MICROSOFT WORD 195 computer application. A grading form window 171 is also displayed on top of and to the side of the constructed response 193. Typically, the grading form window 171 may be moved by the human evaluator to a different area of the screen to prevent it from obstructing the evaluator's view of any portion of the constructed response. Furthermore, as shown in FIG. 5, the human evaluator will generally have access to the tools of the computer application through the command line near the top of the screen as well as the scroll bars, etc. Again, it should be noted that the computer application has been executed in the "Viewer" mode so that the evaluator cannot alter the constructed response. This is important for maintaining accurate records and ensuring that any future assessment is based on the examinee's actual response. FIG. 6 similarly shows a monitor 201 at an assessment station in which another constructed response 203 is presented through a different computer application, here the NCARB Delivery program. Other drawing applications, such as AUTOCAD and MICROSTATION, could also be utilized for architectural type constructed responses as discussed above.

Like FIG. 5, FIG. 6 shows that the human evaluator may manipulate the constructed response with the usual tools provided by the computer application. In this architectural application, the tools include zooming capabilities, measuring line segments or angles, rotating the constructed response, and deleting a layer (for multilayer floorplans, ceilingplans, etc.). Again, the grading form 171 is displayed to the human evaluator and may be moved around the screen to prevent obstruction of the constructed response. While the systems and methods described above relate to all of the assessment systems and methods of the present invention, the discussion has concentrated on the use of the systems for executing and initializing appropriate computer applications to enable the evaluators to assess the constructed responses in the most helpful environment. Other aspects of the present invention involves assigning more than one human evaluator to assess each constructed response. With multiple evaluators, scores awarded to the constructed responses may be more reliable. In addition, overlapping evaluators and constructed responses provide monitoring capabilities through cross-correlation studies.

To facilitate the controlled distribution of constructed responses and the monitoring of evaluators' performance and difficulty of constructed response categories, data relating to the constructed responses, the human evaluators and the scores, along with the computer applications, should be stored in memory in a relational manner. As discussed in the summary above, the present invention further provides systems and methods for monitoring the assessments made by the human evaluators, as well as the difficulty of the constructed response categories. The systems and methods also facilitate psychometric studies and presentation arrangements intended to minimize external effects on the human evaluators from adversely affecting the accuracy and reliability of the scores awarded to the constructed responses.

In order to explain these methods, it is helpful to describe a preferred relational database for storage of data related to the constructed responses and human evaluators. To enable the systems and methods of the present invention to be used as test development, assessment monitoring and evaluator control tools, each constructed response is keyed to at least one computer application and at least one human evaluator. Each human evaluator is qualified to assess certain categories of constructed responses so a constructed response is also preferably keyed to a human evaluator qualified to assess the constructed response based on the constructed response category. Scores awarded by the human evaluators are stored and keyed to both the constructed response to which the score was provided and the human evaluator who provided it.

Figure 7:
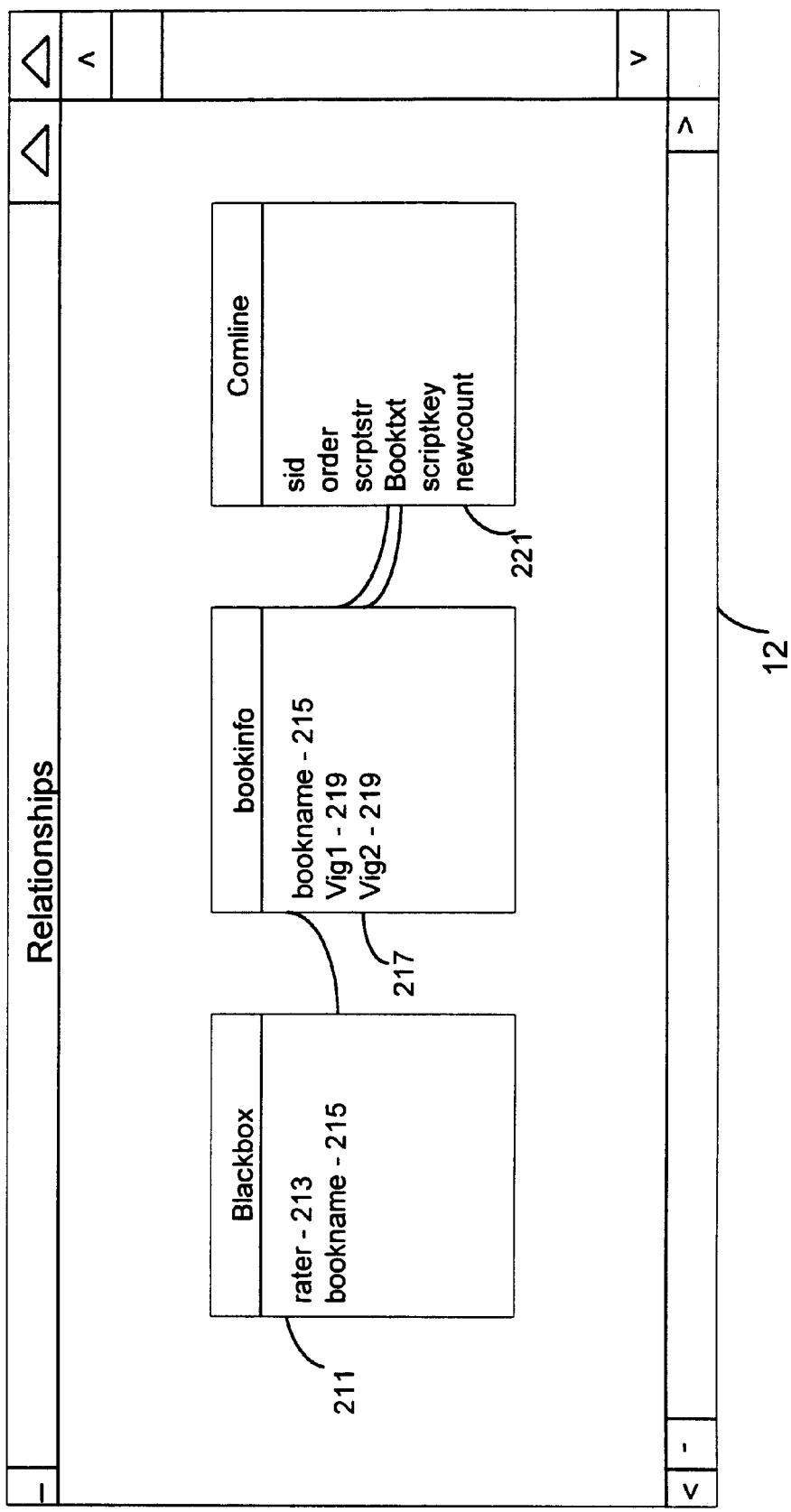
FIG. 7 shows a preferred storage means as a relational database with three tables.

The relationships and data stored in the storage means in a preferred embodiment of the present invention are shown in FIGS. 7–10. First, FIG. 7 shows how each human evaluator is generally assigned to specific constructed responses. As discussed above, the human evaluator assessing each constructed response may be assigned based on his/her area of expertise. For example, a physics professor would usually not be assigned to assess the English literature constructed responses, but would be assigned to assess the constructed responses related to the physics questions asked in a given test. Therefore, first, each constructed response should be categorized based on the question which prompted the response. The constructed response categories can be as broad as simply giving the name of the test for which the constructed responses were submitted (e.g., SAT II, MCAT, AP English), or may be as narrow as a single question or prompt (e.g., Explain the first law of thermodynamics). Thus, all constructed responses in a particular constructed response category could be all of the examinees' responses to a single question from a given test. The constructed response category, may, alternatively, be more general. For example, the category could merely be "Chemistry" and, thus, all constructed responses which were created in response to a chemistry question would fall in this constructed response category. It would generally be up to a test developer or scoring expert to determine into which category a particular constructed response should fall. Often, this determination is made before the constructed response is even formed by an examinee based solely on the question, or prompt. Thus, for example, all AP English Exam constructed responses could fall into one category. The MCAT questions may be divided into categories based on whether the question requires a discussion of biochemistry, physics, mathematics, etc.

In one preferred embodiment of the present invention, the constructed responses are also sub-categorized. The sub-categorization provides for multiple levels of assignment of human evaluators to constructed responses. The primary category is typically even more specific than academic discipline. For example, the NCARB constructed responses are categorized into divisions (e.g., site planning, building design, building planning), then vignettes (e.g., roof plan, ramp, site design, mechanical and electrical plan, parking lot, etc.), then script (representing different settings for the particular vignette), then isomorph (e.g., A, B, C, D, representing minor differences within a script). Any of these levels, or sub-categories, may be used to assign a human evaluator to a constructed response. Similar sub-categorization is equally applicable to other tests and types of constructed responses. With the above-described sub-categorization, a constructed response may be identified by, or keyed to, any number of levels of categories within the database. For example, an NCARB constructed response may have a constructed response category of "C231A," indicating a category that is five levels deep in an item hierarchy. If only four levels are desired or necessary for the assignment process of the present invention, the constructed response may be keyed to a category indicated by "C231" with the isomorph being deleted as undesired.

After each constructed response is assigned to a particular category, human evaluators are assigned to assess the constructed responses. FIG. 7 shows the assignment of human evaluators to constructed response categories, called Vignettes, through relational data tables stored in memory. The table labeled "Blackbox" 211 assigns a human evaluator, or "rater" 213, to a bookname 215. The "Blackbox" table 211 is then linked, or related to, the "bookinfo" table 217. In the "bookinfo" table 217, each bookname 215 is assigned to at least one constructed response category 219, or vignette, which is also referred to as "Booktxt". Thus, each human evaluator is assigned to at least one category of constructed responses. Finally, the "bookinfol" table 217 is linked to the "Comline" table 221 through which each constructed response category 219, or "Booktxt" is related to every constructed response which has been assigned to that category.

Each constructed response, furthermore, is preferably stored in relationship to other information necessary to distinguish that constructed response, such as the examinee who created the constructed response, the student identification (sid), the order in which the student received the question (order), the record number of the constructed response (scriptkey), and the computer application which should be utilized in presenting the constructed response to the human evaluator (APP, see FIG. 10). Therefore, the relationships shown among the tables of FIG. 7 exemplify one preferred means for storing the data in memory so that it is accessible to the test developers, to scoring controllers, and to the processor.

This data arrangement also eases the assignment of new human evaluators to constructed responses. If a new evaluator is to begin assessing constructed responses, the evaluator's identification code is preferably inserted as a "rater" and assigned to a bookname. The new evaluator may be assigned to the same bookname as another evaluator with similar areas of expertise. Otherwise, to assign a new evaluator to different constructed response categories, a new bookname is preferably created and assigned to one or more constructed response categories, or vignettes. Thus, with two insertions into the relational database, a new evaluator may be initialized and assigned to any number and combination of constructed response categories and individual constructed responses. This will be particularly useful in performing the cross-correlation analysis which are described more fully below in connection with the flowchart shown in FIG. 11.

Figure 8:
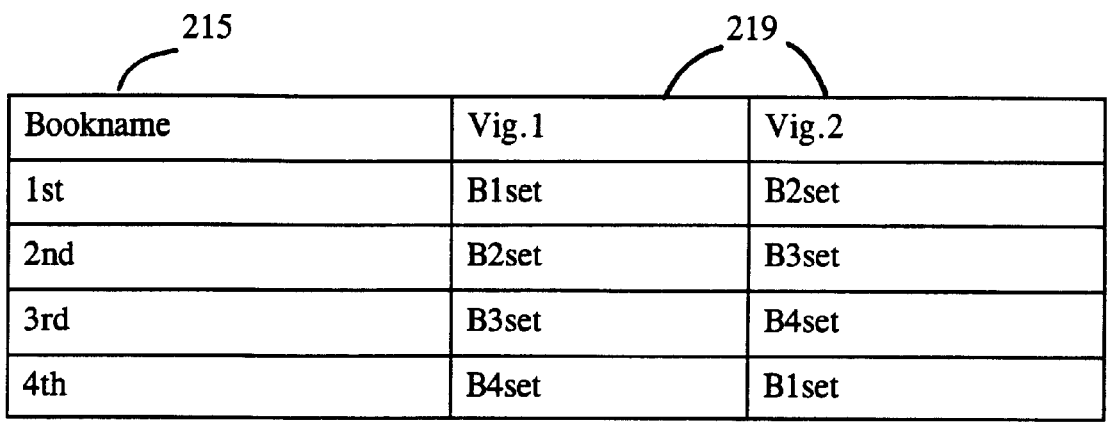
FIG. 8 shows a preferred database for use in assigning at least two constructed response categories to each human evaluator.

In order to perform the cross-correlation methods of evaluating the human evaluators' scoring and the difficulty of the constructed response categories, or questions, the evaluators are assigned such that at least two evaluators are assigned to each constructed response. Furthermore, the evaluators should, preferably, be assigned to more than one constructed response category each. This will provide more insight into whether an individual evaluator is scoring more harshly or leniently than others or whether higher or lower scores awarded by an evaluator to specific constructed responses are the result of the difficulty of the constructed response category. The structure of the data collection scheme in the "Bookinfo" table 217 of FIG. 7 is shown in more detail in FIG. 8. In FIG. 8, each bookname 215 is assigned to at least two different constructed response categories 219, which are here designated as B1 set, B2 set, etc. Furthermore, each constructed response category is assigned to at least two different booknames. Thus, the human evaluators assigned to the first bookname will score all the constructed responses falling under the categories B1 set and B2 set; all human evaluators assigned to the second bookname will score all the constructed responses falling under the categories B2 set and B3 set, etc. As a result, each human evaluator will assess constructed responses from at least two constructed response categories and constructed responses from each constructed response category will be assessed by at least two different human evaluators.

The data table of FIG. 9 shows yet another example of the relationship between the human evaluators 213 and the constructed response categories 219. Again, the constructed responses are all divided into a plurality of categories, here designated as c607–c609 and c804–c806. The human evaluators are again each assigned to at least two different constructed response categories. In FIG. 9, the chart shows that each human evaluator 213 is, in fact, assigned to six different constructed response categories. The third and fourth columns in the chart of FIG. 9 represent the vignettes or categories 219, as shown in FIGS. 7 and 8. However, FIG. 9 has an additional column 225 for "order" of presentment of the constructed responses falling in the designated categories. The order field in this table is preferably automatically generated.

In one preferred embodiment, human evaluators with an odd numbered identification code are automatically assigned an opposite order from those evaluators with an even number identification code who are assigned to the same constructed response categories. It should be understood that other ordering schemes may be used. In general, the processor examines the table of all constructed response categories and determines all the categories that contain constructed responses. Those categories are then numbered in ascending and descending order based on the category name, and the resulting order may be used as the default.

Thus, according to the table shown in FIG. 9, evaluator 153 will first be presented with constructed responses from question types c607 and c806. Similarly, evaluator 154 will first be presented with constructed responses from question types c609 and c804. This ensures that during a particular scoring session, the constructed responses will be assessed by human evaluators under different conditions. A scoring session may be defined as any period of time during which a human evaluator is logged onto the system to assess constructed responses. The scoring session could also be more narrowly defined as a given day during which scoring will be performed by a number of human evaluators. Thus, a scoring session may be defined in various ways and any such definition may be used consistently with the methods of the present invention.

By changing the order 225 in which the human evaluators 213 are presented with the constructed responses, external influences on the evaluators' scoring may be balanced by scores awarded by other evaluators at different periods during the scoring session. For example, human evaluators may tend to score constructed responses more harshly near the beginning of a scoring session and more leniently near the end. By selectively ordering the presentation of the constructed responses to the human evaluators, the final score awarded a constructed response could be based on multiple scores awarded at different point in the scoring session and the systems and methods of the present invention, thereby, compensate for the psychometric influences on the human evaluators. The methods utilized to reduce the effect of psychometric influences on scoring are described in more detail below in connection with FIG. 12.

Referring again to FIG. 9, it should be noted that beside each constructed response category 219 is a symbol, either an asterisk "*" or a question mark "?". As described above, the "order" column 225 in the chart of FIG. 9 indicates in which order the constructed response categories 219 will be presented to the corresponding human evaluators. However, within the categories, the constructed responses themselves may be presented in any order. The asterisk and question mark are part of a set of symbols, defined as "Regular Expressions" in MICROSOFT operating systems and applications, available for internally ordering a block of solutions. In preferred embodiments of the present invention as demonstrated in FIG. 9, the constructed responses assigned to the human evaluators are specified to a certain level within the sub-categories, but the asterisk and question mark indicate that any further sub-category within the sub-category indicated should be included in the block to be transmitted to the corresponding human evaluator. In the terminology implemented by the NCARB test program, the blocks are specified based on the vignette and script, but the isomorph sub-category is represented by the Regular Expression and, thus, any constructed response keyed to an isomorph within the script indicated would be included in the block of constructed responses assigned to the particular human evaluator. More complicated blocks may be implemented through use of other Regular Expressions available through the MICROSOFT operating system and provided in a table in MICROSOFT's VISUAL BASIC HELP.

For example, the constructed responses within the c607 category are presented to evaluator 153 first. However, there may be any number of constructed responses within that constructed response category. The asterisk "*" indicates to the system that the constructed responses within that category should be presented in a random, i.e. non-determined, order. Other presentation options, such as numerically, alphanumerically, etc. may also be used to order the constructed responses within the constructed response categories. It should be understood that other symbols could easily be utilized to indicate various types of ordering. Regardless of the order of the constructed responses within the constructed response category, the ordering of the categories provided by a design like that shown in FIG. 9 reduces the possibility that two human evaluators will assess the same constructed response at the same point in their scoring sessions.

FIG. 10 shows a table of constructed responses. Each constructed response has a unique solution name 227 and scriptkey 233. In this example, the solution name further indicates the constructed response category, or booktxt 219, to which the constructed response has been assigned. Each constructed response is also stored in relationship to a specific computer application 231 for use in presenting the constructed response to the human evaluators.

Although not shown in FIG. 10, additional columns could be added for the scores awarded to the constructed response by each of the human evaluators and the final score assigned to the constructed response. In preferred embodiments, however, a separate table for storing scores in relation to the constructed responses for which they were awarded and the human evaluators who entered the score is utilized. Additional information stored in the scores table could include the time of day the score was entered, the date the score was entered, the time the evaluator spent assessing the constructed response, the state of the evaluator who entered the score (i.e., whether an experienced reader, an adjudicator or a scoring leader) and any comments entered by the evaluator. Additional benefits of utilizing a separate scores table in the database is the optimization of memory utilization and data normalization. If a column were created for each of the scores potentially awarded a constructed response, some of the columns would remain empty (e.g., when less than the maximum number of human evaluators awards a score to a constructed response). In addition, altering the number of human evaluators scoring a constructed response would be more complicated. The creation of the scores table within the database used in the present invention is well within the knowledge of those skilled in the art and variations in the data stored in the scores table is contemplated by the systems and methods of the present invention.

Figure 11A:
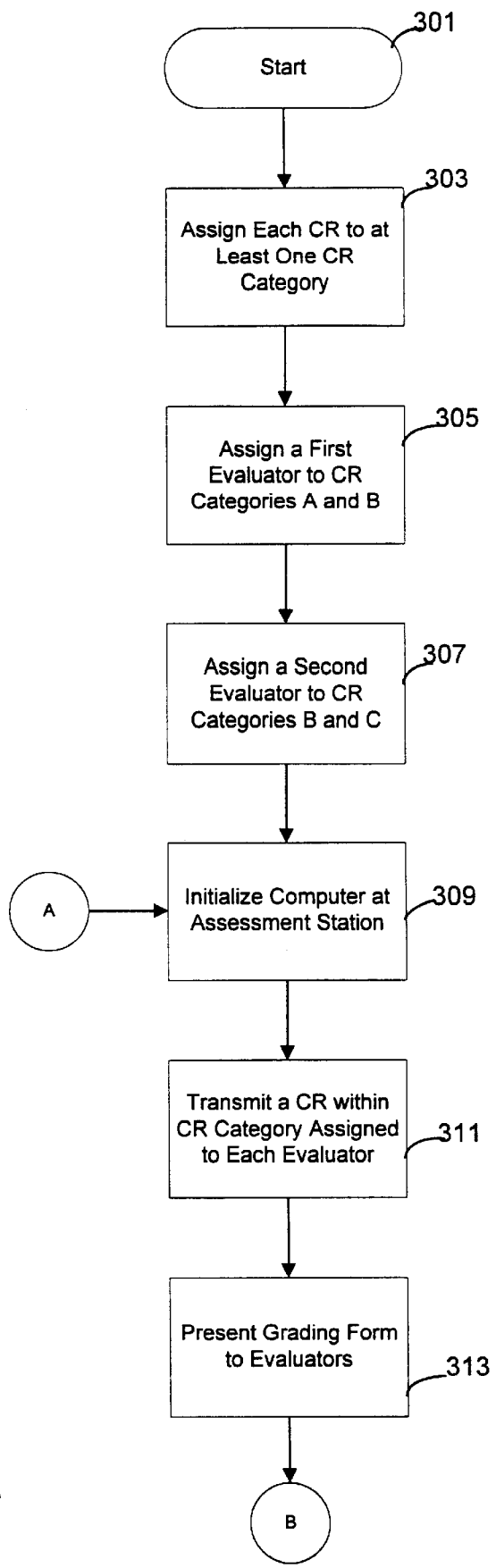
FIGS. 11A and 11B show a high level flowchart of the steps carried out in connection with cross-correlation studies according to a preferred embodiment of the present invention.
Figure 11B:
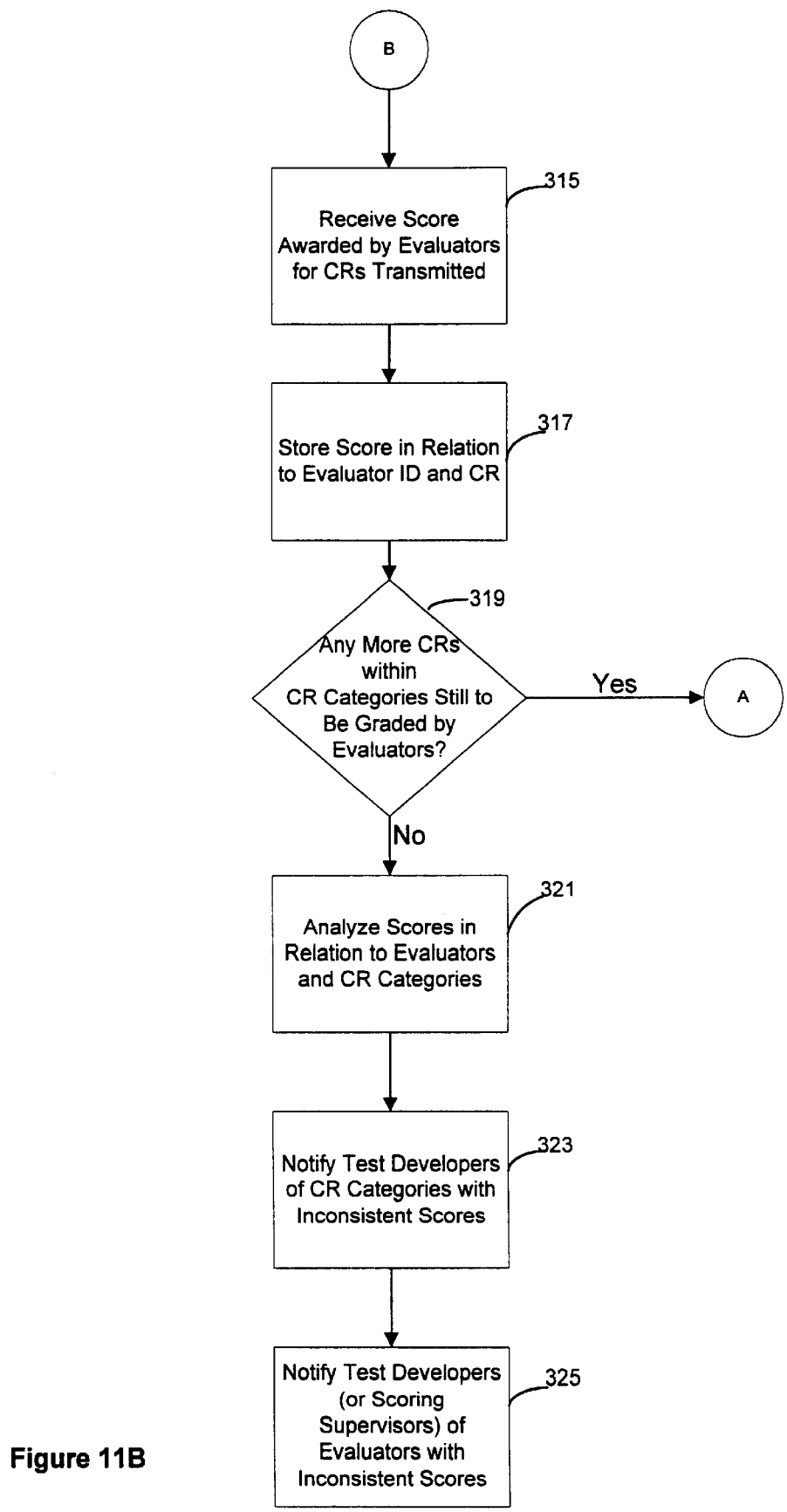

Now that the various relationships between the data stored in memory have been shown and described, the additional methods and systems of the present invention relating to the selective presentation of constructed responses to human evaluators and the analysis of the scores awarded by the human evaluators to the constructed responses falling within certain categories may be more easily described. Referring now to FIGS. 11A–11B, one preferred method employed by a computer-based assessment system to monitor human evaluator assessment and difficulty of constructed response categories is shown. The method starts at step 301 (FIG. 11A). First, each constructed response (CR) is assigned to a particular constructed response category (step 303). As discussed above, the assignment often occurs before the constructed response is even created based solely on the question, or prompt. Next, at step 305, a first human evaluator is assigned to at least two constructed response categories to assess. At step 307, a second human evaluator is also assigned to at least two constructed response categories, but at least one of the categories is the same as a category assigned to the first human evaluator. This provides the overlap for cross-correlation studies and analysis of scores and constructed response categories used to determine if a human evaluator is scoring more harshly than others or if a constructed response category the human evaluator is assessing is more difficult than other categories.

At step 309, the assessment station must be initialized, which may include determining the appropriate computer application for presentation of the constructed responses as described in connection with FIGS. 2A–2C. Next, at step 311, the processor must access the memory to obtain a constructed response within the constructed response category assigned to each of the human evaluators and then transmit the constructed response(s) to the appropriate assessment stations. Once the constructed response has been imported into the computer application, again as described above in connection with FIGS. 2A–2C, the processor presents a grading form to the human evaluator at the assessment station (step 313). Each human evaluator then evaluates the constructed response presented at his/her assessment station, utilizing the tools provided by the computer application, and determine a score to award to the constructed response. The processor awaits a signal from the assessment station indicating that the human evaluator has entered and submitted a score to be awarded to the constructed response. At step 315 (FIG. 11B), the processor receives the score awarded by the human evaluator and transmitted from the assessment station. Next, the processor stores the score in memory in relation to the human evaluator awarding the score and the constructed response for which the score was awarded (step 317). These same steps are performed for each human evaluator currently logged on to the scoring system.

After a score has been received from an assessment station, the method determines if any more constructed responses within the constructed response categories assigned to the human evaluator at that assessment station remain to be scored by that human evaluator (step 319). If so, the system returns to step 309 and continues to transmit constructed responses to the evaluator until no more remain within the constructed response categories assigned to him/her.

When no more constructed responses remain to be scored or at another designated time, such as between assessments of constructed responses (not shown), the system analyzes the scores awarded by the human evaluators in relation to the constructed response categories (step 321) assigned to each. Because the human evaluators are assigned to overlapping categories, the average score for each human evaluator can provide more information about the evaluator's assessment and about the questions in the categories to which they are assigned. For example, if evaluator 1 is assigned to categories A and B, evaluator 2 to categories B and C, and evaluator 3 to categories C and A, information regarding both difficulty of categories and evaluator assessment reliability can be determined. By analyzing the average score awarded to each of the constructed response categories and the average score awarded by each human evaluator to those categories, the difficulty of the questions within the categories can be determined. Furthermore, evaluators who are scoring more harshly or leniently than others can be identified by evaluating the average score awarded by each of the evaluators for a specific category. Any combination of scores from certain evaluators or for specific constructed response categories may be evaluated automatically by the methods and systems of the present invention as requested by the test developers or scoring quality control personnel.

The most important aspect of the present invention in connection with the statistical analysis described above is the ability to generate and store the data necessary to perform the evaluation. The systems and methods administer and facilitate the design of very complex grading designs which allow for the cross-correlation analysis. Typically, the more complex statistical analysis to be performed by test developers and scoring quality control personnel would be performed with other computer applications, like SAS or SPSS. However, the data stored in the database of the present invention which is generated by the actual assessment of constructed responses by human evaluators allows real time monitoring and analysis of the evaluators' assessments and the difficulty of the constructed response categories which was not available in the prior art.

Based on the evaluations performed in step 321, various constructed response categories or evaluators may be deemed to be outside an acceptable range. Thus, at step 323, the system can automatically notify test developers of constructed response categories which are determined to be more or less difficult than expected. Likewise, at step 325, the system can automatically notify the test developers or scoring quality control personnel of human evaluators who are scoring more harshly or leniently than others.

FIG. 12 shows a preferred embodiment of a method implemented in a computer-based assessment system for controlling the presentation of constructed responses to the human evaluators. This method is capable of presenting the constructed responses in any order designated by the test developers or scoring quality control personnel. Typically, the method of FIG. 12 would be used to reduce the influence of psychometric factors on the scores awarded to the constructed responses. As discussed briefly above, studies have shown that human evaluators may grade differently throughout the day, or within a specified period of time. Therefore, it is desirable to control the presentation of constructed responses to the human evaluators during the period of time that the evaluators are logged onto the system, i.e., during the scoring session.

Figure 12A:
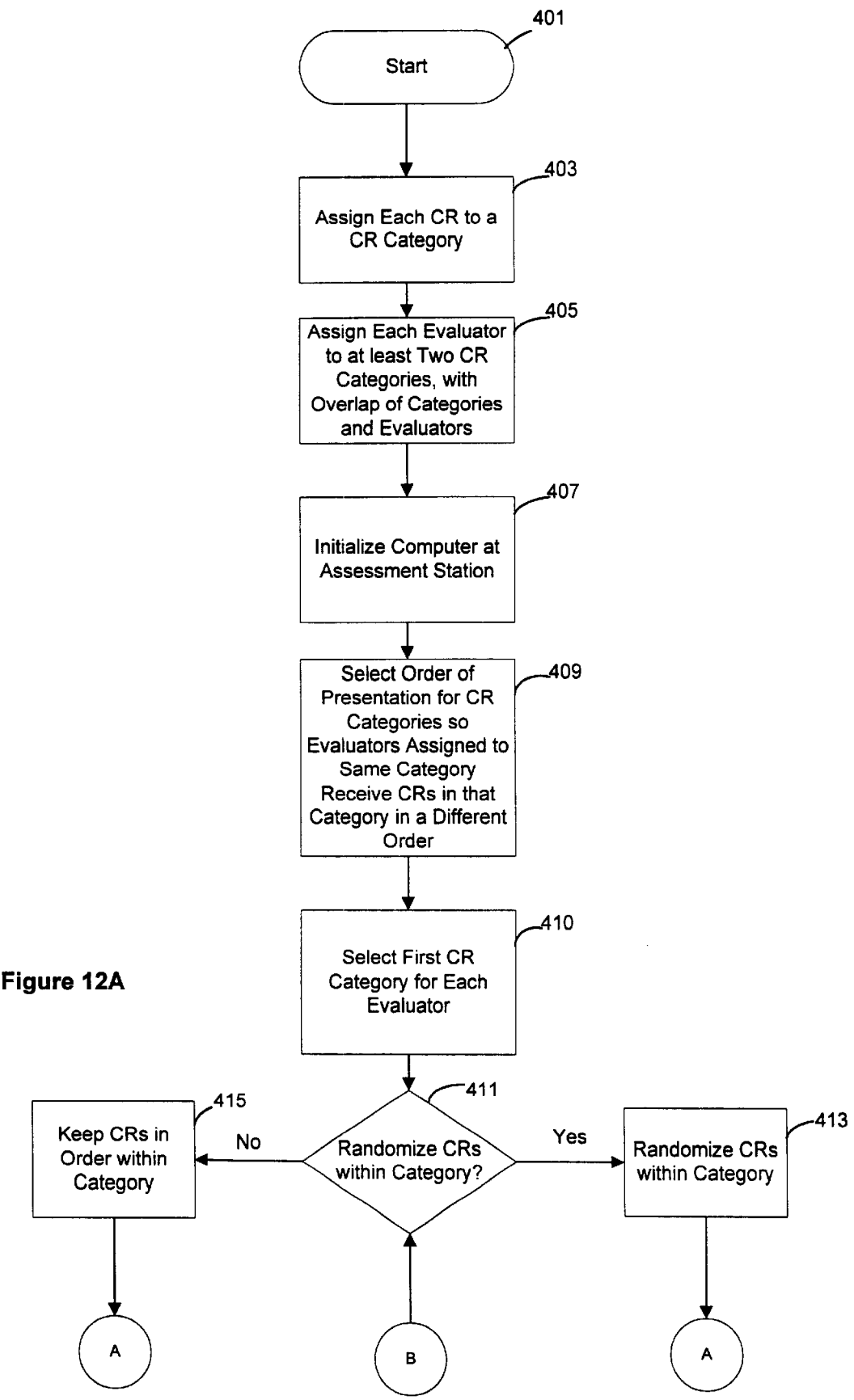
FIGS. 12A and 12B show a high level flowchart of the steps carried out in connection with the distribution of constructed responses to more than one human evaluator during a particular scoring session according to a preferred embodiment of the present invention.
Figure 12B:
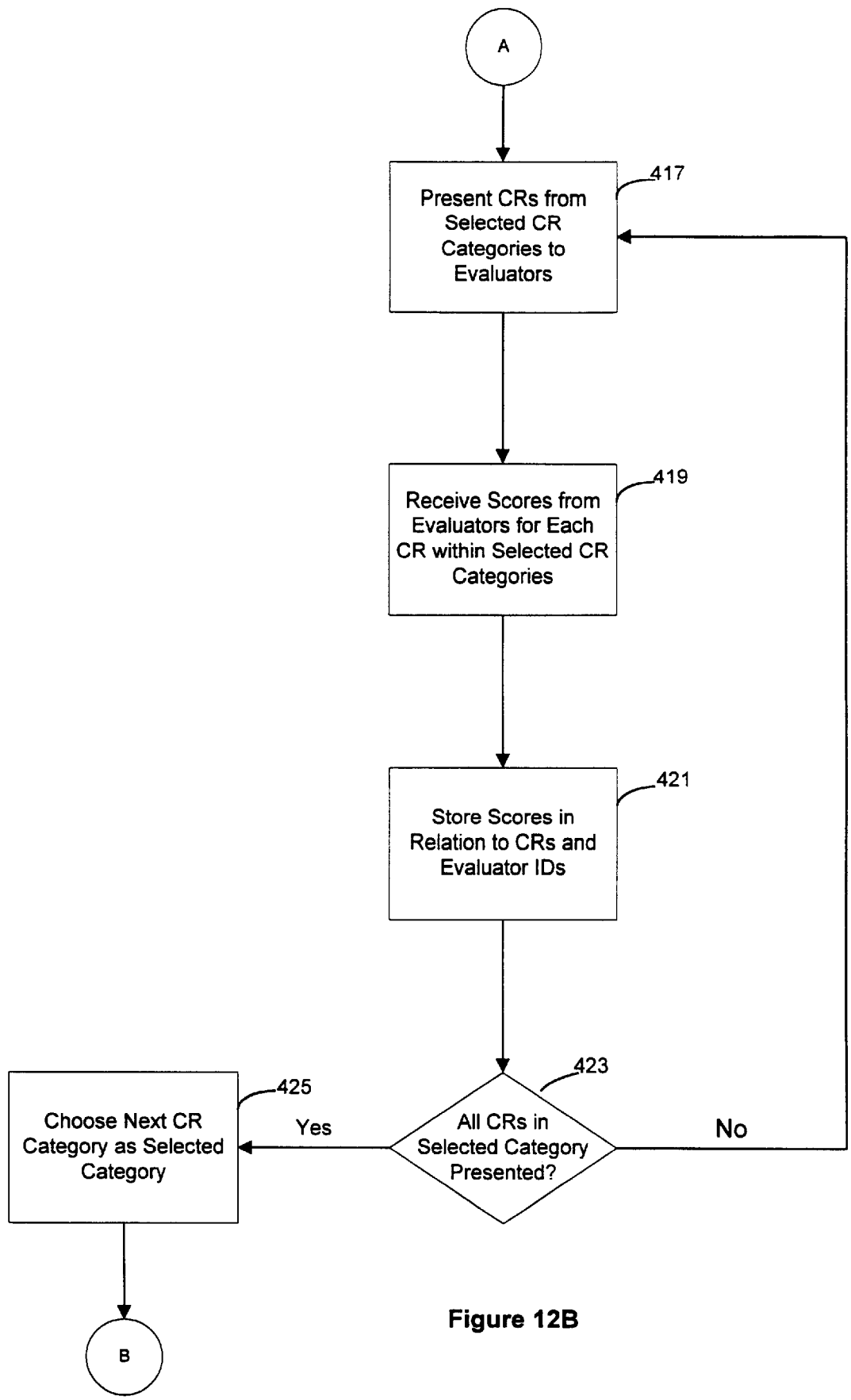

FIGS. 12A–12B show a flowchart of a preferred method for controlled presentation of the constructed responses to the human evaluators. The method starts (step 401, in FIG. 12A) and each constructed response is assigned to a constructed response category (step 403). Again, the constructed response is preferably assigned to a category before it is even created by reference merely to the question, or prompt, which elicited the constructed response. Next, each human evaluator should be assigned to at least two constructed response categories (step 405). The assignment of evaluators to categories is also preferably performed such that each category is assigned to at least two human evaluators. This assures that each constructed response is assessed by more than one human evaluator. Again, at step 407, the assessment station is initialized to enable presentation of the constructed responses to the human evaluators assigned to the assessment station. As discussed above in connection with FIGS. 2A–2C, the initialization of the assessment station may require the processor to determine which computer application to utilize in presenting the constructed response. Often, all constructed responses within a particular constructed response category utilize the same computer application. Therefore, the assessment station only needs to be initialized once while constructed responses within a single category are being transmitted to the human evaluator assigned to that assessment station.

Next, at step 409, the order of presentation of the constructed response categories to the human evaluators is preferably determined. As discussed above in connection with FIG. 9, the order of presentation may be predetermined and stored in memory in relation to the human evaluator and the constructed response categories. It should be understood that other methods of determining order may also be used.

Preferably, the order of presentation of the constructed responses to the human evaluators will be varied for evaluators assigned to the same constructed response category. For example, if evaluator 1 is assigned to categories A and B, and evaluator 2 is assigned to categories B and C, evaluator 1 and 2 will preferably not receive constructed responses from category B in the same order during the scoring session. Thus, in this example, evaluator 1 could receive constructed responses from category B before those from category A, and evaluator 2 could receive constructed responses from category C before those from category B. This ordering will help prevent evaluators assessing the same constructed responses from receiving those constructed responses at the same period or interval in the scoring session. Thus, extraneous factors which may influence grading can be offset by altering the presentation order of constructed responses.

At step 410, the first constructed response category or categories of constructed responses are selected for each human evaluator. Then, the system may transmit and present constructed responses within the constructed response categories designated as first by the order designation in step 409 of FIG. 12A. However, it may also be desired to selectively present the constructed responses within the selected categories to the evaluators. Therefore, at step 411, the system determines whether the constructed responses within the first constructed response category to be presented should be selectively ordered. In the flowchart, the selective ordering is performed by randomizing the presentation of the constructed responses. If randomization has been selected, the constructed responses within the selected category to be transmitted to the assessment station are randomly ordered (step 413). If the randomize function is not desired, the constructed responses are transmitted in the order in which they appear in memory. Again, some other ordering could be performed, such as alphanumerical based on solution name, prioritization based on date of test administration, amount of time taken to create the constructed response by the examinee, relative weight of the constructed response in relation to the entire test score, predicted difficulty of constructed response category, based on a different human evaluator's score, etc.

After the order of the constructed responses has been selected, the constructed responses are presented to the appropriate human evaluator based on the selected category order (step 417, in FIG. 12B) and the individual constructed response order. Again, the system and method wait for the evaluator to submit a score for the constructed response currently presented. Then, the processor receives the score from the evaluator for the constructed response (step 419) and stores the score in relation to the constructed response and the human evaluator who awarded the score (step 421).

After a score is entered by the human evaluator for a constructed response, the method determines if all the constructed responses for the selected constructed response category or categories being presented to the human evaluator have been transmitted at step 423. If not, the method returns to step 417 and the next constructed response in the order is transmitted. If all the constructed responses within the selected category have been presented to the evaluator, the method goes to the next constructed response category designated by the order column for the evaluator (step 425) and again determines if the constructed responses within that category should be selectively ordered (step 411). This method occurs for each human evaluator until all the evaluators have assessed all the constructed responses within their assigned constructed response categories.

After the steps shown in FIGS. 12A–12B have been performed, each constructed response will have at least two scores awarded to it. The test developers may then determine how to assign a final score. The method of the present invention, however, helps to reduce the impact of extraneous factors on the final score to be assigned to the constructed response.

While the invention has been described and illustrated with reference to specific embodiments, those skilled in the art will recognize that modification and variations may be made without departing from the principles of the invention as described hereinabove and set forth in the following claims.

APPENDIX A

```
LAUNCHING CODE: (this code calls "Runner", also copied
below)
Private Sub launchbtn_MouseDown (Button As Integer, Shift As
Integer, X As Single, Y As Single)
#If Win32 Then
Dim delcode As Long
#Else
Dim delcode As Integer
#End If
Dim comsql$, progpart$, scriptpart$, solpart$
Dim newlaunch$, launch$
Dim GrabScript$
Dim gotclass&, randscore%, bailout%, longtemp&, errcycle%
Dim allclass$, sidstr$, findme$, fraction$
Dim success&, StartTime&, EndTime&
Dim wordfound As Boolean, filefound As Boolean
Dim myclass$
Dim wintext As String * 50
On Error GoTo run_err
        launchbtn.Enabled = False
        byebutton.Enabled = False
        Notes.Enabled = False
        Unload Form4
    '' success& = SetWindowPos(Form4.hwnd, HWND_TOP, 0, 0, 0,
0, Flags)
        Label14.Caption = ". . . loading the solution . . ."
        Me.Enabled = False
        Combo1.Text = 1
        Label19.Caption = 0
        goback.Enabled = False
        longtemp& = 50: wintext$ = Space(50) : wintext$ = ""
        taskhelp = 0: errcycle% = 1: comcycle% = 1: deliver = 0
        Screen.MousePointer = 11
        filefound = False: delcode = 0
        Do While filefound = False Or delcode <> Abs(True) "<=
32
            randloop% = randloop% + 1
            bailout% = 0
            fraction$ = randloop% & "/" & SizeOfComSnap%
            Dragger.Caption = "Grader " & rrr% & "; " & fraction$
            label2.Caption = rndray(randloop%) .t_key
            label4.Caption = randloop%
            scrptstr$ = rndray(randloop%) .t_scr
            scriptkey% = rndray(randloop%) .t_key
            sid = rndray(randloop%) .t_SOLNAME
            appstr$ = rndray(randloop%) .t_app
            sidstr$ = sid
        'GrabScript$ = ExtractSol(solpath$, sidstr$) 'get
script from
database
            progpart$ = exepath$ & Left$(scrptstr$, 2) & "d "
            scriptpart$ = scriptpath$ & Left$(scrptstr$, 2) & "\"
& scrptstr$ & "
"
            If InStr(UCase$(appstr$), "DELIVERY") Then
                If nftswitch$ <> "true" Then
                    solpart$ = solpath$ & scrptstr$ & sidstr$
                Else
                    solpart$ = solpath$ & sidstr$
```

APPENDIX A-continued

```
                End If
                newlaunch$ = progpart$ & scriptpart$ & solpart$ & "
-nosave"
                findme$ = solpart$ & ".*"
                filefound = Len(Dir(findme$))
        ElseIf InStr (UCase$ (appstr$), "SNDSYS") Then
                    newlaunch$ = appstr$ & "qrecord.exe " & solpath$
& sidstr$ &
".wav"
                    findme$ = solpath$ & sidstr$ & ".wav"
                    filefound = Len(Dir(findme$))
        ElseIf InStr (UCase$ (appstr$), "WORDVIEW") Then
                    newlaunch$ = appstr$ & "wordview.exe " & solpath$
& sidstr$ &
scrptstr$ & ".doc"
                    findme$ = solpath$ & sidstr$ & scrptstr$ & ".doc"
                    filefound = Len(Dir(findme$))
        End If
        Label3.Caption = newlaunch$
        label8.Caption = scriptkey%
        launch$ = newlaunch$
        If Not filefound Then
            bailout% = MsgBox("The solution file" & findme$ & "
cannot be
found. " & "Please inform one of the ETS staff who will try
to resolve the
problem. After someone has been notified, then you can
press the YES
button to see the next solution in the list. Click the NO
button to end
the program.", 4 + 16, "Missing solution: ")
            If bailout% = 7 Then Call ByeButton_MouseDown(1, 0,
1, 1)
        Else
            If go$ = "false" Then
                delcode = 33
            Else
                DoEvents
                StartTime& = timeGetTime()
                delcode = Runner(newlaunch$, appstr$, exepath$)
                'wordfound = FindWord
                'delcode = WinExec(newlaunch$, 3)
                #If Win16 Then
                        DoEvents: DoEvents: DoEvents: DoEvents
                #End If
                If delcode <> Abs(True) Then
                        bailout% = MsgBox("There was an error
trying to run " & newlaunch$ & " ." & "Please inform one of
the ETS staff who will try to resolve the problem. After
someone has been notified, then you can press the YES button
to see the next solution in the list. Click the NO button
to end the program.", 4 + 16, "error: " & delcode)
                'End If
                If bailout% = 7 Then Call ByeButton_MouseDown(1,
0, 1, 1)
                End If
            End If
        End If
    Loop
RUNNER: (this procedure relies on "CreateTheProcess", copied
below)
Function Runner(SendLaunch$, docstring$, exepath$) As Long
    Dim wordfound&
    Dim appview%
    Dim RetCP&
    Dim SNDfound As Boolean
    Dim warn As Long, warningOK As Long, posted As Long
'Public Const SW_HIDE = 0
'Public Const SW_MINIMIZE = 6
'Public Const SW_SHOWMINIMIZED = 2
        SNDfound = InStr(docstring$, "SNDSYS")
        If SNDfound Then
            appview% = 1
        ElseIf docstring$ = "mini" Then
            appview% = 0
        Else
            appview% = 3
        End If
        Rem delcode = WinExec(sendlaunch$, appview%) 'not using
```

APPENDIX A-continued

```
WinExec
anymore.
        RetCP& = CreateTheProcess(SendLaunch$, exepath$)
        Rem MsgBox RetCP&
        Sleep (500)
        warn = findawin("Warning")
        If warn > 0 Then
            warningOK = findchild(warn, "OK")
            posted = PostMessage(warningOK, WM_LBUTTONDOWN, 0,
&HA000A)
            posted PostMessage(warningOK, WM_LBUTTONUP, 0,
&HA000A)
            DoEvents
        End If
        Runner = RetCP& ''' delcode
        If SNDfound Then
            DoEvents: DoEvents
            parent$ = "Quick Recorder"
            buttoncap$ = "#playbmp"
            Call hitbutton (parent$, buttoncap$)
    End If
End Function
======================================
(this relies on 2 structures, "PROCESS_INFORMATION and
STARTUPINFO, copied below)
Function CreateTheProcess(CommandLine$, path$) As Long
Dim pInfo As PROCESS_INFORMATION
Dim sInfo As STARTUPINFO
Dim sNull As String
Dim hStd&
Dim opener$
Dim ret&, box&, CPret&
Dim scoop$, answer$
Dim finder$, firstquote%
Dim total$, curdirnull$
Dim redirect$, IdleRET&
MousePointer = 11
sInfo.dwFlags = STARTF_USESHOWWINDOW
sInfo.wShowWindow = SW_SHOWNORMAL
curdirnull$ = path$ & sNull
    total$ = CommandLine$
    total$ = total$ + sNull
    ChDrive path$
    ChDir path$
    sInfo.cb = Len(sInfo)
    CPret& = CreateProcess(sNull, total$, ByVal 0&, ByVal 0&,
1&,
HIGH_PRIORITY_CLASS, ByVal 0&, curdirnull$, sInfo, pInfo)
    IdleRET& = WaitForInputIdle(pInfo.hProcess, INFINITE) '
won't return til
app has fully loaded
'ret& = WaitForSingleObject (pInfo.hProcess, INFINITE) 'rem:
do this for
batch compscoring
'ret& = TerminateProcess(pInfo.hProcess, 0&) ''rem: we are
manually
terminating later
'ret& = CloseHandle (pInfo.hThread)
'ret& = CloseHandle (pInfo.hProcess)
On Error GoTo errhand
CreateTheProcess = CPret&
Exit Function
errhand:
If Err.Number = 70 Then
        Resume
Else
        MsgBox (Err.Description)
        Exit Function
End If
End Function
================================
    Type PROCESS_INFORMATION
hProcess As Long
    hThread As Long
        dwProcessId As Long
        dwThreadId As Long
End Type
    Type STARTUPINFO
    cb As Long
```

APPENDIX A-continued

```
    lpReserved As String
    lpDesktop As String
    lpTitle As String
    dwX As Long
    dwY As Long
    dwXSize As Long
    dwYSize As Long
    dwXCount Chars As Long
    dwYCount Chars As Long
    dwFillAttribute As Long
    dwFlags As Long
    wShowWindow As Integer
    cbReserved2 As Integer
    lpReserved2 As Long
    hStdInput As Long
    hStdOutput As Long
hStdError As Long
    End Type
```

What is claimed is:

1. An application independent assessment system having a number of assessment stations at which human evaluators are assigned to assess constructed responses, comprising:
   a data storage means for storing each of the constructed responses in relation to selected ones of the human evaluators and in relation to a specified computer application adapted to present the related constructed response, said specified computer application being one of at least a plurality of computer applications available for presentation of the constructed response; and
   a processing means for selecting one constructed response stored in the storage means for assessment, for identifying an active assessment station at which one of the selected human evaluators is assigned, and for enabling the specified computer application to present the selected constructed response at the active assessment station so identified.

2. The system of claim 1, wherein the storage means contains assignments relating each human evaluator to at least one computer application.

3. The system of claim 1, wherein each constructed response is categorized within one of a plurality of constructed response categories and wherein the human evaluators are assigned to assess at least one predetermined constructed response category.

4. The system of claim 3, wherein each human evaluator is assigned to assess constructed responses within at least two constructed response categories.

5. The system of claim 3 further comprising:
   a communication link between the processing means and the assessment stations for transmitting constructed responses from the storage means to the assessment stations and for transmitting scores awarded by the human evaluators operating from the assessment stations to the processing means; and
   the storage means further storing the scores awarded by the human evaluators to the constructed responses in relation to the constructed responses and the human evaluators.

6. The system of claim 1, wherein the computer applications include word processing programs, drawing programs, audio programs and video programs.

7. The system of claim 1, wherein the constructed responses include at least one of the following: written answers, figural responses, scanned images, drawings, verbal responses, and videotaped performances.

8. The system of claim 1, wherein each constructed response comprises a computer file.

9. The system of claim 8, wherein a name extension for the computer file is indicative of the related computer applications adapted to present the constructed response.

10. The system of claim 1, wherein the at least one assessment station comprises:
    a monitor for presenting video and textual images to the human evaluator assigned to the assessment station; and
    an audio means for presenting audio signals to the human evaluator assigned to the assessment station.

11. A method of controlling presentation of constructed responses to human evaluators during an assessment session, wherein each constructed response is assigned to at least one constructed response category and is assessed by at least two human evaluators, the method comprising the steps of:
    assigning each human evaluator to at least two constructed response categories;
    ordering the constructed responses to be presented to the human evaluators at an assessment station, such that the human evaluators assigned to assess the same constructed responses receive the constructed responses in a different order during the assessment session.

12. The method of claim 11, wherein the constructed responses are ordered by time shifting the presentation of the constructed responses to the human evaluators.

13. The method of claim 11, wherein the constructed responses assigned to a first category are presented to a first human evaluator before the constructed responses assigned to a second category and wherein the constructed responses assigned to the second category are presented to a second human evaluator before the constructed responses assigned to the first category.

14. The method of claim 11, wherein the constructed responses assigned to a category are presented in random order to the human evaluators.

15. The method of claim 11, wherein each constructed response may be presented to a human evaluator through at least one computer application, the method further comprising the steps of:
    determining the computer application to use for presenting each constructed response; and enabling the computer application at the assessment station and importing the constructed response into the computer application.

16. The method of claim 15, further comprising the steps of:

identifying a first assessment station associated with a first human evaluator;

identifying a second assessment station associated with a second human evaluator;

electronically transmitting constructed responses of at least two categories to the first and the second assessment stations such that at least one of the categories transmitted to each of the first and the second assessment stations is the same;

electronically receiving assessments for the constructed responses provided by the first and the second human evaluators from the first and the second assessment station, respectively; and comparing the assessments received from the first human evaluator and the assessments received from the second human evaluator.

* * * * *